United States Patent
Kim et al.

(10) Patent No.: US 8,538,401 B2
(45) Date of Patent: Sep. 17, 2013

(54) MOBILE TERMINAL AND CONTROLLING METHOD THEREOF

(75) Inventors: Jonghwan Kim, Incheon (KR); Hyunghoon Oh, Seoul (KR); Jongseok Park, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/323,276

(22) Filed: Dec. 12, 2011

(65) Prior Publication Data

US 2012/0157073 A1  Jun. 21, 2012

(30) Foreign Application Priority Data

Dec. 21, 2010  (KR) ........................ 10-2010-0131976

(51) Int. Cl.
  *H04M 3/00*  (2006.01)
  *G06F 3/041*  (2006.01)
  *H04W 24/00*  (2009.01)

(52) U.S. Cl.
  USPC ............. 455/418; 455/566; 702/184; 702/41; 340/540; 340/539; 340/506; 340/588; 73/12.06

(58) Field of Classification Search
  USPC ........... 455/418, 566; 702/184, 41; 340/540, 340/539, 506, 588; 73/12.06
  See application file for complete search history.

(56) References Cited

U.S. PATENT DOCUMENTS

| | | |
|---|---|---|
| 6,453,266 B1 | 9/2002 | Chainer et al. |
| 2009/0267762 A1 | 10/2009 | Shyu et al. |
| 2010/0167791 A1 | 7/2010 | Lim |
| 2011/0057807 A1 | 3/2011 | Asai |

FOREIGN PATENT DOCUMENTS

| | | |
|---|---|---|
| EP | 1708075 A2 | 10/2006 |
| EP | 2211319 A1 | 7/2010 |
| EP | 2224706 A1 | 9/2010 |
| JP | 2004-128547 A | 4/2004 |
| WO | WO 2005/071932 A1 | 8/2005 |
| WO | WO 2010/007846 A1 | 1/2010 |

*Primary Examiner* — Meless N Zewdu
*Assistant Examiner* — Jean Chang
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a touchscreen configured to display information and receive touch inputs; a sensor unit configured to detect a gravity characteristic of the mobile terminal; and a controller configured to output a user-settable gravity sensitivity threshold option for setting a gravity detected sensitivity of the sensor unit, to receive a selection signal indicating a selection of a first gravity sensitivity threshold, to determine the mobile terminal is in a state of falling when the detected gravity characteristic of the mobile terminal is less than or equal to the selected first gravity sensitivity threshold, and to automatically execute a predetermined function mapped to the determined falling state.

20 Claims, 24 Drawing Sheets

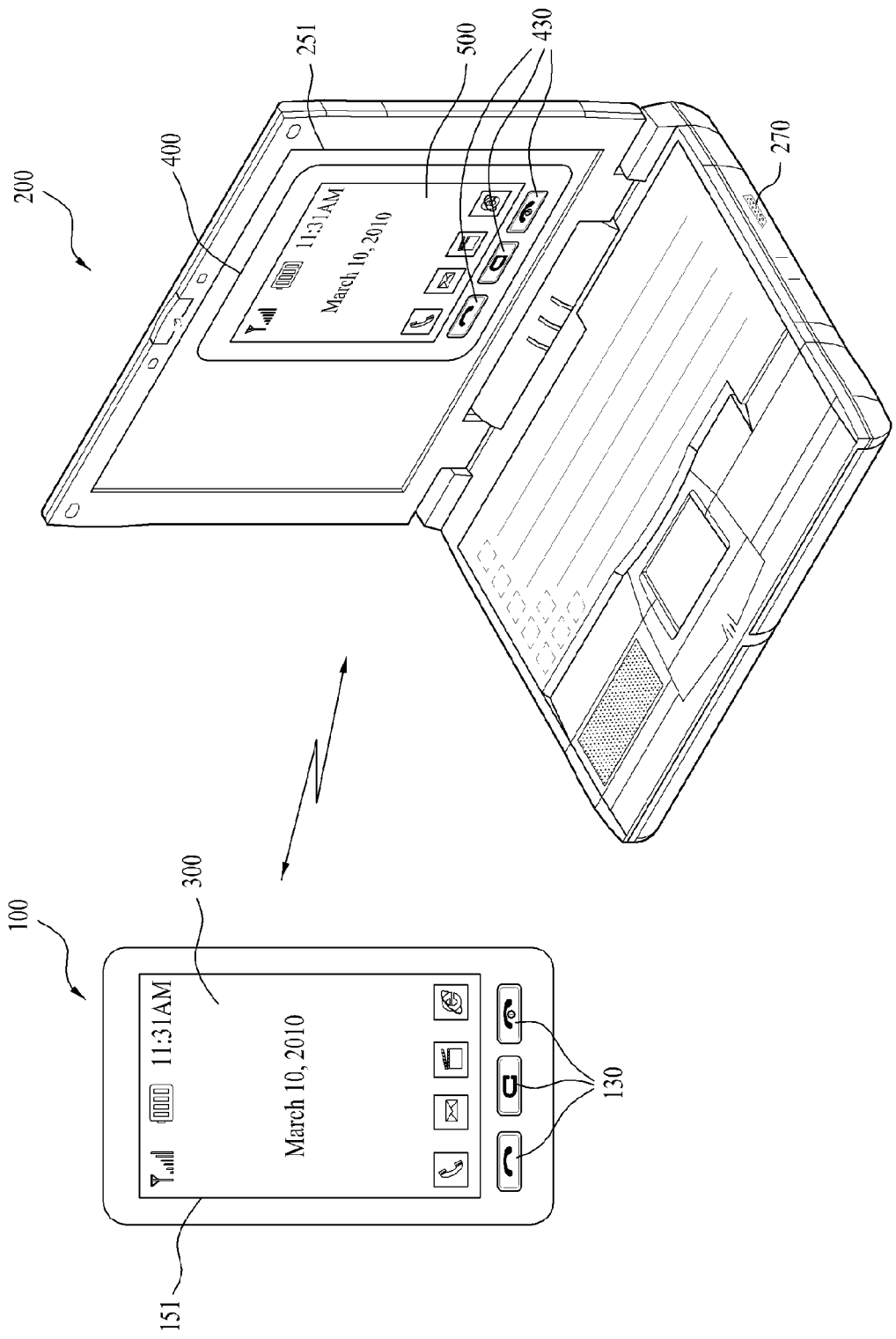

FIG. 14
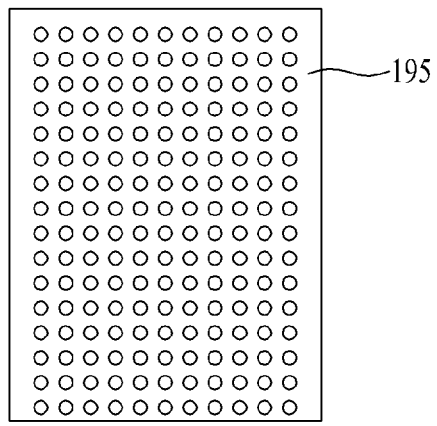
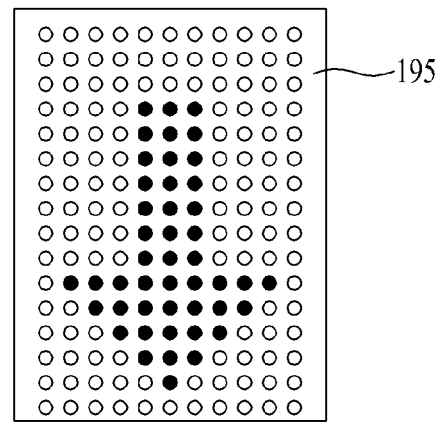
(14-1)  (14-2)

(17-1)

(17-2)

MOBILE TERMINAL AND CONTROLLING METHOD THEREOF

Pursuant to 35 U.S.C. §119(a), this application claims the benefit of earlier filing date and right of priority to Korean Application No. 10-2010-0131976, filed on Dec. 21, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal use in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. In addition, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

While the mobile terminal is in use, a user may drop or toss the mobile terminal intentionally or unintentionally.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which an event (e.g., a user drops the mobile terminal intentionally or unintentionally) can be utilized for user's convenience in using the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides in one aspect a mobile terminal including a wireless communication unit configured to wirelessly communicate with at least one other terminal; a touchscreen configured to display information and receive touch inputs; a sensor unit configured to detect a gravity characteristic of the mobile terminal; and a controller configured to output a user-settable gravity sensitivity threshold option for setting a gravity detecting sensitivity of the sensor unit, to receive a selection signal indicating a selection of a first gravity sensitivity threshold, to determine the mobile terminal is in a state of falling when the detected gravity characteristic of the mobile terminal is less than or equal to the selected first gravity sensitivity threshold, and to automatically execute a predetermined function mapped to the determined falling state.

In another aspect, the present invention provides a method of controlling a mobile terminal. The method includes allowing, via a wireless communication unit of the mobile terminal, wirelessly communication with at least one other terminal; detecting, via a sensor unit of the mobile terminal, a gravity characteristic of the mobile terminal; outputting, via a touchscreen of the mobile terminal, a user-settable gravity sensitivity threshold option for setting a gravity detecting sensitivity of the sensor unit; receiving, via a controller of the mobile terminal, a selection signal indicating a selection of a first gravity sensitivity threshold; determining, via the controller, the mobile terminal is in a state of falling when the detected gravity characteristic of the mobile terminal is less than or equal to the selected first gravity sensitivity threshold; and automatically executing, via the controller, a predetermined function mapped to the determined falling state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5B is a diagram of a mobile terminal and a display device connected together to implement one embodiment of the present invention;

FIG. 14 is a diagram for a configuration of LED dot matrix for implementing a method of controlling a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and the terms 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
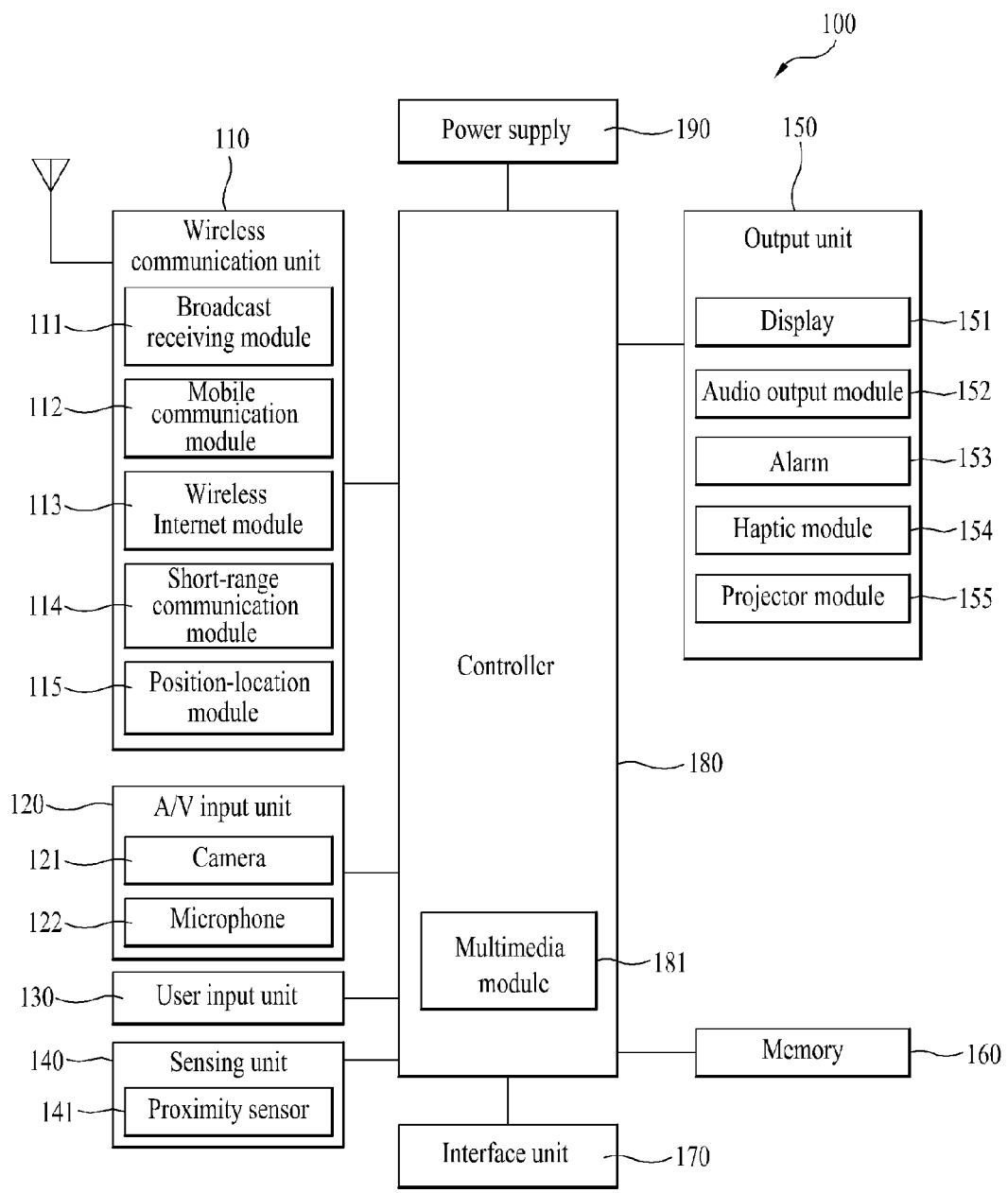
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless interne module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which includes a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSDPA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. In addition, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100.

The sensing unit 140 can include at least one of a gyro sensor, an acceleration sensor, a gravity sensor and the like.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example of the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can detect whether a prescribed portion of the display 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or back side direction of the mobile terminal 100. In addition, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in when a touch is input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The controller 180 (i.e., the main controller) can further include a sub-controller for controlling the sensing unit 140. In particular, the sub-controller can be implemented within the main controller or can be implemented separately from the main controller.

As the mobile terminal 100 enters an idle mode to enable the main controller to stay in a sleep mode, the sub-controller may continue to stay in an awake mode to enable the sensing unit 140 to keep operating normally in the idle mode.

The power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
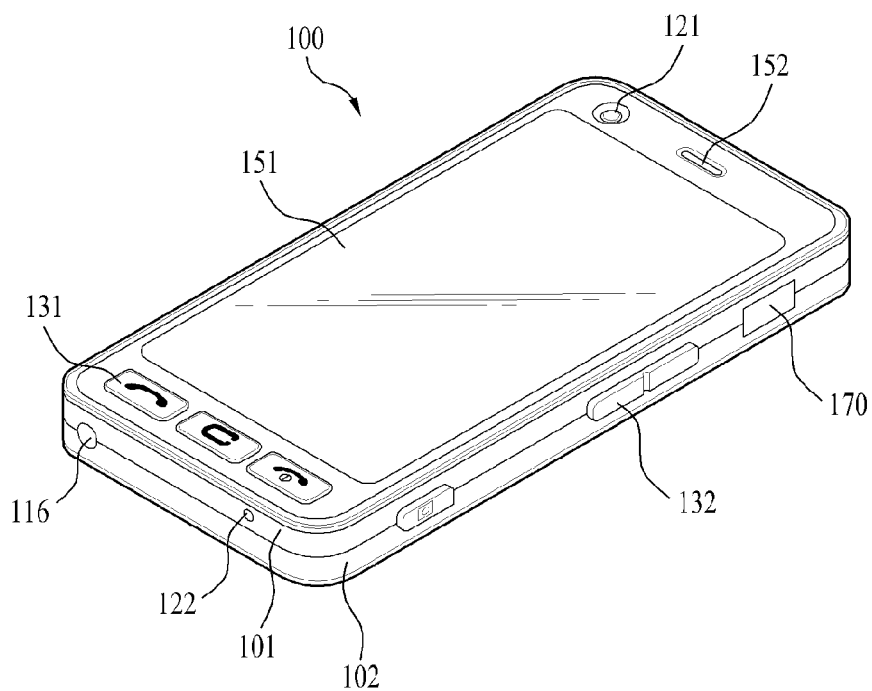
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
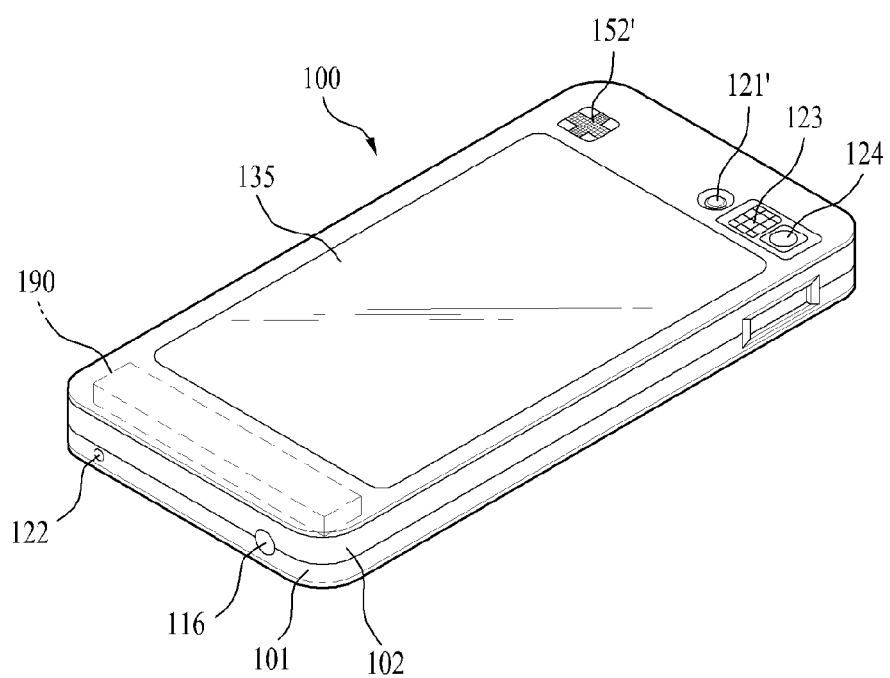
FIG. 2B is a rear perspective diagram of a mobile terminal according to one embodiment of the present invention.

FIG. 2B is a perspective diagram of a back side of the terminal shown in FIG. 2A.

Referring to FIG. 2B, a camera 121' can be additionally provided to a back side of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the minor 124.

An additional audio output unit 152' can be provided to the back side of the terminal body. The additional audio output unit 152' can implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this instance, if the display 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a configuration for providing the aforesaid projector module to the slider type mobile terminal 100 is further explained with reference to FIGS. 3A and 3B.

Figure 3A:
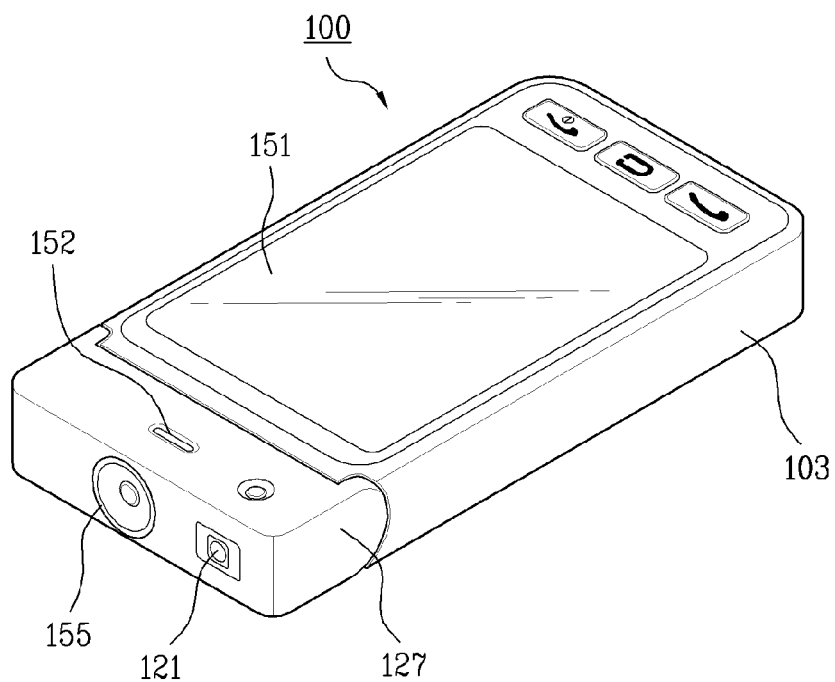
FIGS. 3A and 3B are perspective diagrams of a mobile terminal according to another embodiment of the present invention.
Figure 3B:
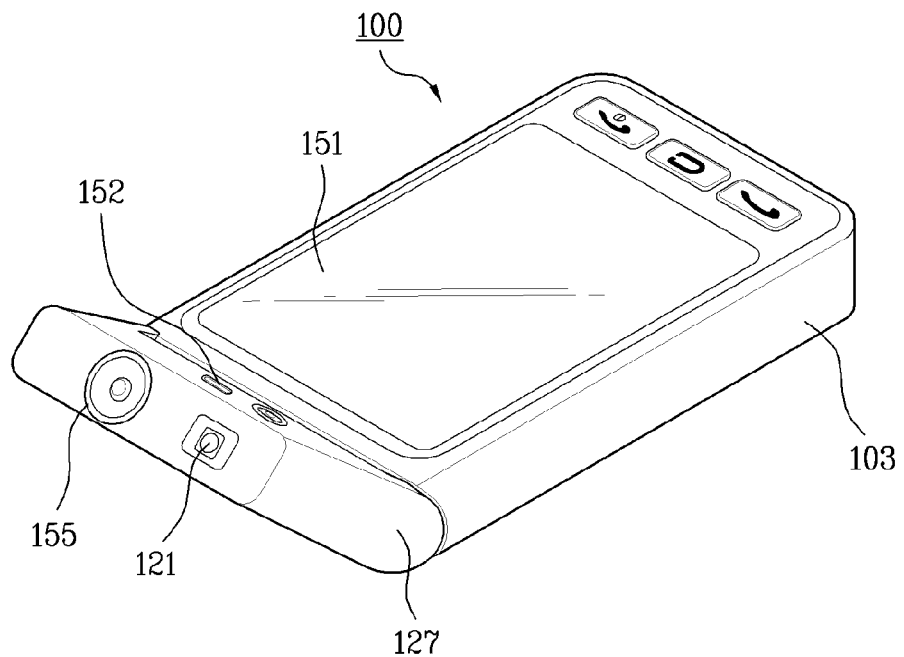

FIGS. 3A and 3B are perspective diagrams of a mobile terminal according to another embodiment of the present invention.

Referring to FIGS. 3A and 3B, in the mobile terminal 100, a projector body 127 having a projector module 155 is rotatably assembled to a first body 103 loaded with a display unit 151. As mentioned in the foregoing description, the projector body 127 can be assembled to the first body 103 by sliding or hinging relative to the first body 200.

Referring to FIG. 3A, while the projector body 127 is in the open position, the projector body 127 rotatably assembled to the first body 103 is rotated. As shown, the projector body 127 can be hinged to the first body 103. A projection angle of the projector body 127 can also be adjusted. A camera 121 can be provided to the projector body 127 to photograph the image or picture projected by the projector 155.

Referring to FIGS. 3A and 3B, the projector body 127 can be hinged/opened relative to the first body 103.

Figure 4:
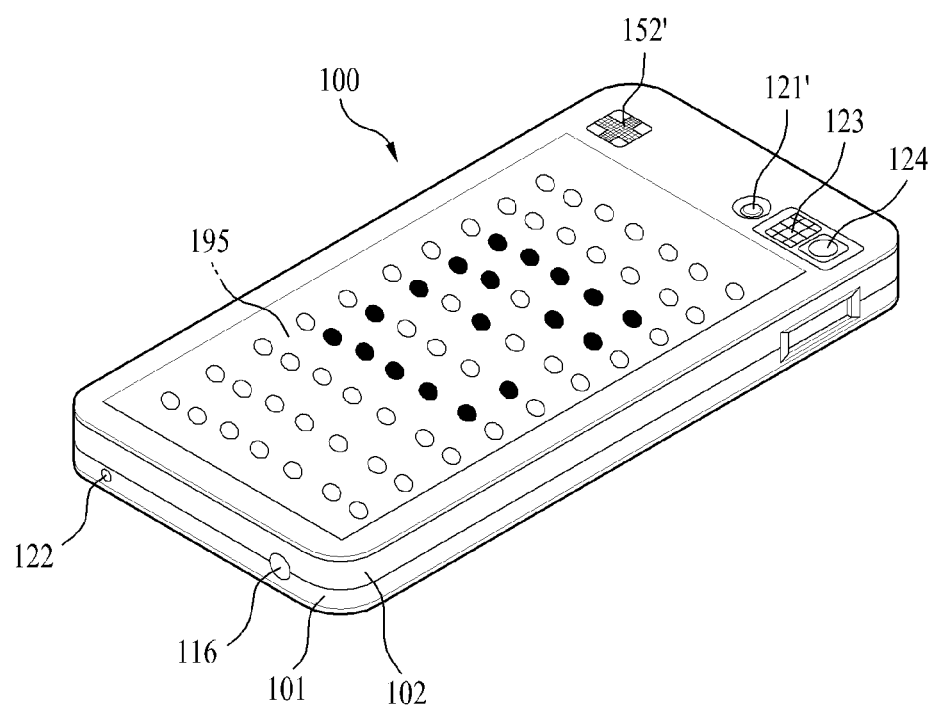
FIG. 4 is a perspective diagram of a back side of the mobile terminal shown in FIG. 2A.

In the following description, a configuration of providing the above-described mobile terminal 100 with an LED (light emitting diode) dot matrix 195 is explained in detail with reference to FIG. 4. FIG. 4 is a perspective diagram of a back side of the mobile terminal shown in FIG. 2A.

Referring to FIG. 4, the LED dot matrix 195 can be provided to a back side of the mobile terminal 100. In addition, the LED dot matrix 195 can play a role as a display unit of the mobile terminal 100 as well. The LED dot matrix 195 can display various indicators and/or a current time information.

For instance, when the mobile terminal 100 receives a message, an indicator indicating an occurrence of such an event as a message reception can be displayed on the LED dot matrix 195. In particular, the indicator can be displayed by flicking or scrolling on the LED dot matrix 195.

In the following description, an external display device connectible to the mobile terminal is explained.

First of all, no limitation is put on a display device described in the present specification as long as the display device can receive and display information related to a display of the mobile terminal by being connected to the mobile terminal for communication. For example, the display device can include one of a laptop computer, a tablet computer, a desktop computer, a television (e.g., digital TV, smart TV, etc.) and the like, by which the present invention is non-limited.

Figure 5A:
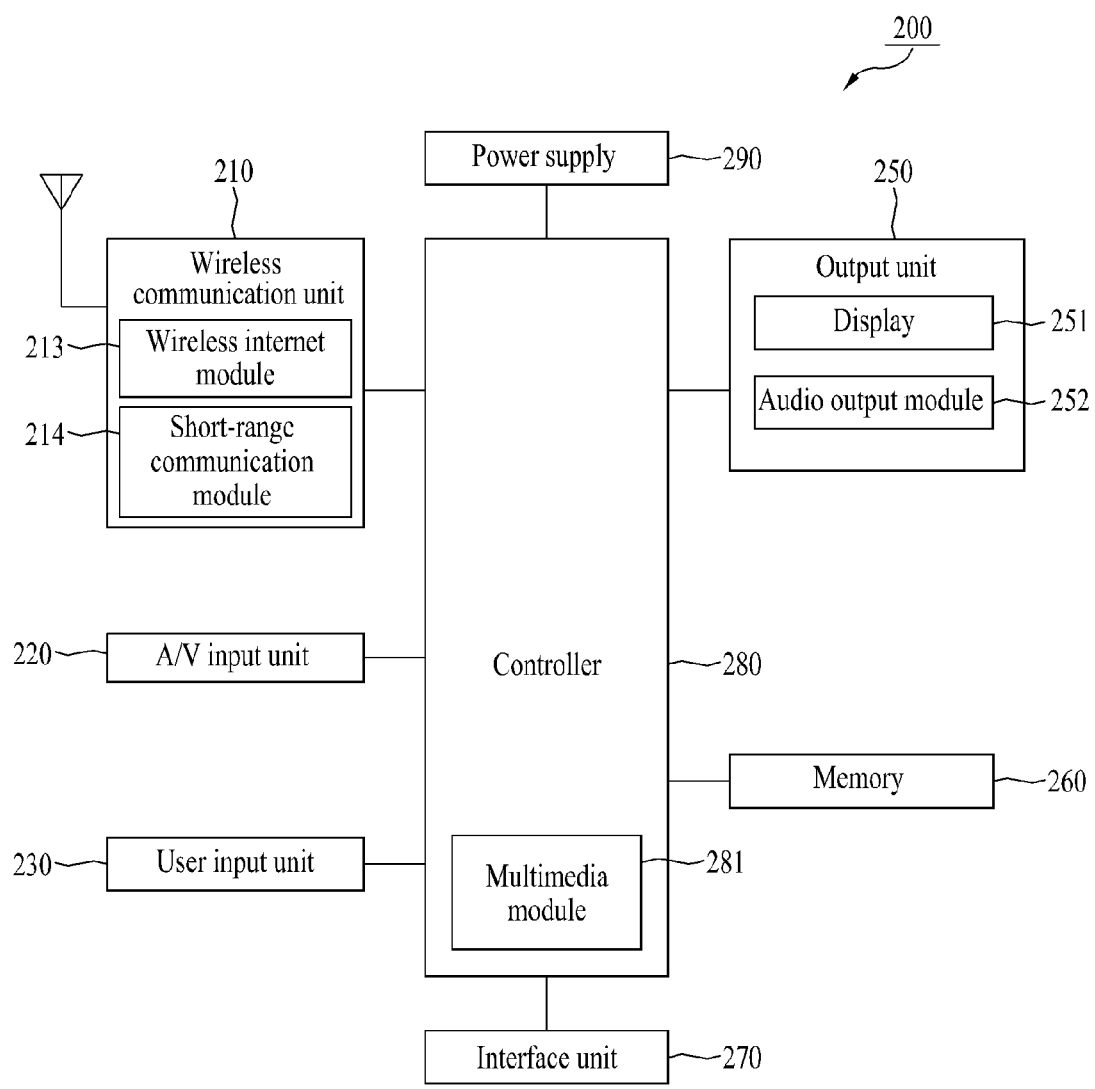
FIG. 5A is a block diagram of a display device according to one embodiment of the present invention.

FIG. 5A is a block diagram of a display device according to one embodiment of the present invention.

Referring to FIG. 5A, a display device 200 includes a wireless communication unit 210, an A/V (audio/video) input unit 220, a user input unit 230, an output unit 250, a memory 260, an interface unit 270, a controller 280, a power supply unit 290 and the like.

The wireless communication unit 210 can include a wireless internet module 213 and a short range communication module 214. In addition, the output unit 250 can include a display unit 251 and an audio output module 253.

The above-described components of the display device 200 are identical or considerably similar to the former corresponding components of the mobile terminal 100 described with reference to FIG. 1. For clarity and convenience of the following description, details of the above components of the display device 200 shall be omitted from the following description.

All the components shown in FIG. 5A may not be necessary. Optionally, components more or less than the components shown in FIG. 5A can be used to implement the display device. For instance, when the display device 200 is a television, it can further include a broadcast receiving module. If the display device 200 is the television, the wireless internet module can be optionally excluded from the display device 200. As the broadcast receiving module is identical or considerably similar to the former broadcast receiving module 111 of the mobile terminal 100 described with reference to FIG. 1, for clarity and convenience of the following description, details of the broadcast receiving module shall be omitted from the following description.

In the following description, the connection between the mobile terminal 100 and the display device 200 is explained with reference to FIG. 5B.

FIG. 5B is a diagram of a mobile terminal and a display device connected together to implement one embodiment of the present invention.

Referring to FIG. 5B, the mobile terminal 100 and the display device 200 can be connected to each other via the interface unit 170 of the mobile terminal 100 and the interface unit 270 of the display device 200. The connection between the mobile terminal 100 and the display device 200 can be established by wire communication or wireless communication (e.g., short range communication, wireless internet communication, etc.).

FIG. 5B shows a configuration of the connection (or access) between the mobile terminal 100 and the display device 200.

For clarity of the following description, in order to discern the components of the mobile terminal 100 from the components of the display device 200, 'first' can be prefixed to each of the components of the mobile terminal 100, while 'second' can be prefixed to each of the components of the display device 200.

For instance, the display unit 151 of the mobile terminal 100 can be named a first display unit 151, the controller 180 of the mobile terminal 100 can be named a first controller 180, the display unit 251 of the display device 200 can be named a second display unit 251, and the controller 280 of the display device 200 can be named a second control unit 280.

An image displayed on the first display unit 151 can be named a first screen image 300. The first screen image 300 can be displayed on the first display unit 151 of the mobile terminal 100.

Once the access between the mobile terminal 100 and the display device 200 is established, the mobile terminal 100 can provide the display device 200 with information about the first screen image 300 displayed on the first display unit 151.

In this instance, an application for processing the information about the first screen image 300 received from the mobile terminal 100 can be installed at the display device 200 in advance.

Hence, when the mobile terminal 100 and the display device 200 are connected with each other, the second controller 280 of the display device 200 can control a monitor window 400 for the first screen image 300 to be displayed on the second display unit 251. In addition, the second controller 280 of the display device 200 controls an image corresponding to the first screen image 300 to be displayed on the monitor window 400. For clarity and convenience of the following description, the image displayed on the monitor window 400 can be named a second screen image 500 to be discerned from the first screen image 300 displayed on the mobile terminal 100.

In particular, the monitor window 400 can have a shape identical or similar to one face of a housing to which the first display unit 151 of the mobile terminal 100 is provided. Therefore, when at least one key button 130 is provided to one face of the housing, a soft key button 430 having the same shape of the at least one key button 130 can be formed at a corresponding position on the monitor window 400.

If a soft key button 430 of the display device 200 is clicked with a mouse (or if the soft key button 430 is touched on the assumption that the second display unit 251 is a touchscreen), the second controller 280 of the display device 200 sends a control signal to the mobile terminal 100 to indicate that the soft key button 430 of the display device 200 has been manipulated.

Having received the control signal, the first controller 180 of the mobile terminal 100 controls a specific function, which corresponds to a manipulation of the key button 130 matching the manipulated soft key button 430, to be executed in the mobile terminal 100.

The first controller 180 of the mobile terminal 100 can control an image according to the executed specific function to be displayed as the first screen image 300 on the first display unit 151. In addition, the first controller 180 of the mobile terminal 100 can transmit information about the first screen image 300 to the display device 200.

If so, the second controller 180 of the display device 200 can control a second screen image 500, which corresponds to the first screen image 300, to be displayed on the monitor window 400.

Thus, a user can indirectly manipulate the mobile terminal 100 by manipulating the monitor window 400 of the display device 200 instead of directly manipulating the mobile terminal 100 and can then view the first screen image 300 displayed on the indirectly manipulated mobile terminal 100 via the second screen image 500 displayed on the display device 200.

It is not mandatory for the monitor window 400 to have the shape identical or similar to one face of the housing to which the first display unit 151 of the mobile terminal 100 is provided. For instance, other icons (e.g., an icon for closing a window, an icon for minimizing a window, an icon for maximizing a window, etc.) can be further displayed on the monitor window 400 in addition to the shape of one face of the housing. Alternatively, the second screen image 500 can be displayed on the monitor window 400 only without the shape of one face of the housing.

The display device 200 receives the information about the first screen image 300 from the mobile terminal 100 and then displays it as the second screen image 500 on the monitor window 400. Therefore, the first screen image 300 and the second screen image 400 can share a content image generated from the mobile terminal 100 with each other.

FIG. 5B exemplarily shows that the content image generated from the mobile terminal 100 is a standby image, by which the present embodiment is non-limited. Further, content images generated from the mobile terminal 100 can include all images related to functions, menus, applications and the like executed in the mobile terminal 100.

In the following description, embodiments relating to a controlling method implemented in the above-configured mobile terminal are explained in detail with reference to the accompanying drawings.

In the following description, if the display module 151 includes a touchscreen, implementation of the following embodiment is further facilitated. Therefore, the following description is made on the assumption that the display module 151 includes a touchscreen. In addition, a display screen of the touchscreen 151 shall be indicated by a reference number 300 in the following description.

Figure 6:
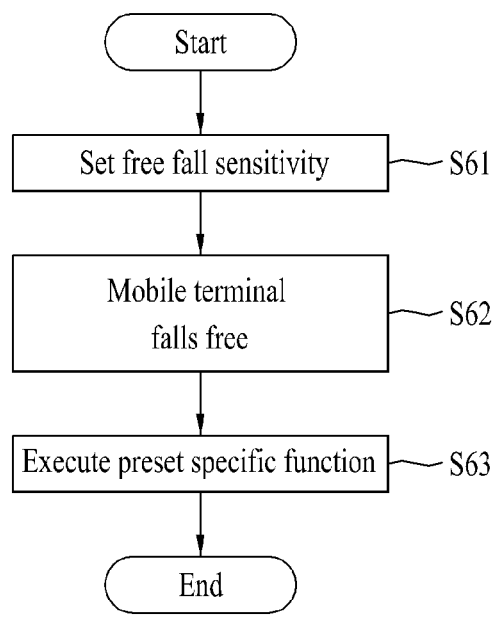
FIG. 6 is a flowchart for a method of controlling a mobile terminal according to one embodiment of the present invention.
Figure 7:
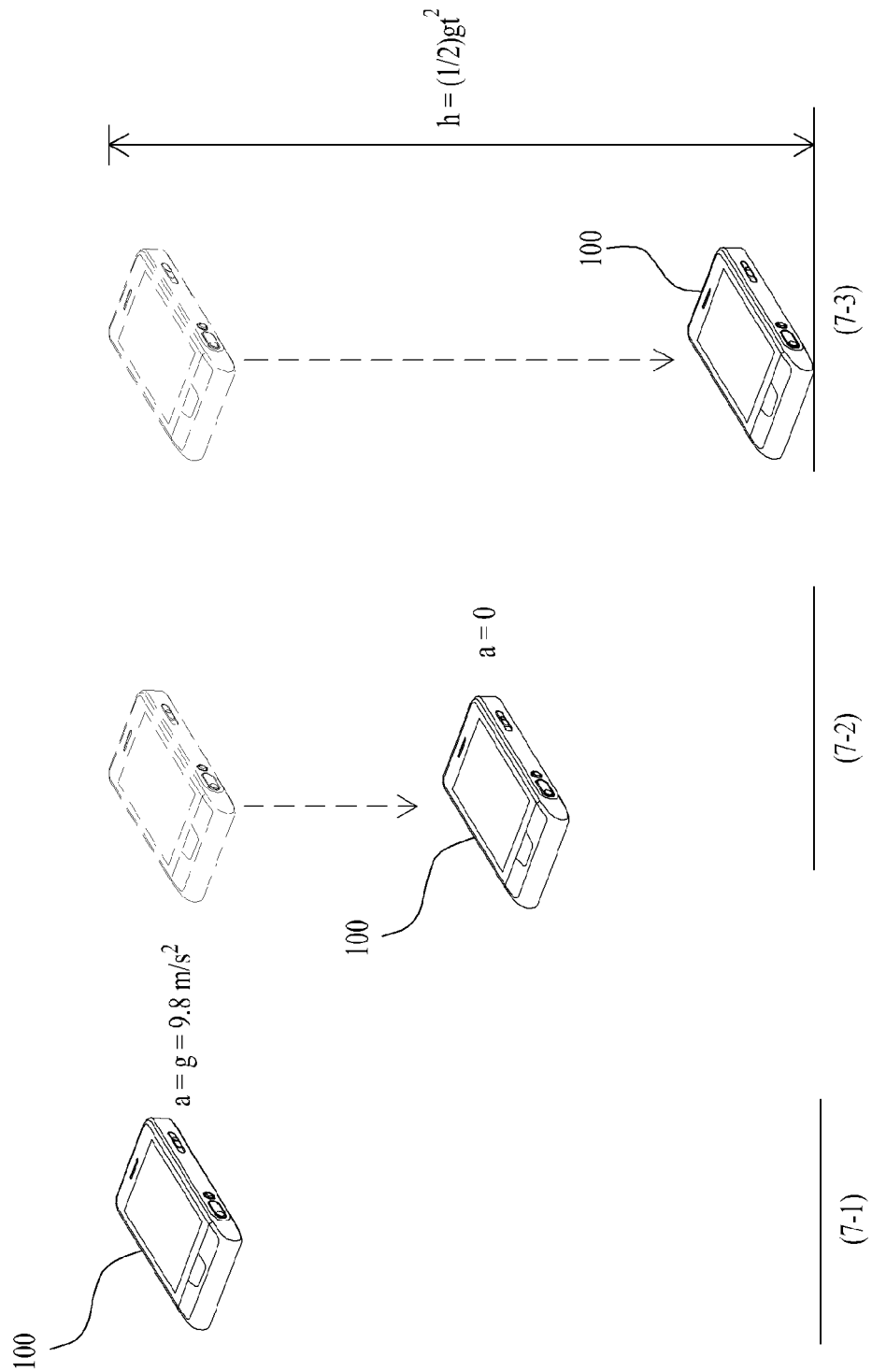
FIG. 7 is a diagram for the concept of free fall of a mobile terminal according to one embodiment of the present invention.

Next, FIG. 6 is a flowchart for a method of controlling a mobile terminal according to one embodiment of the present invention, and FIG. 7 is a diagram for the concept of free fall of a mobile terminal according to one embodiment of the present invention.

Referring to FIG. 7 (7-1), the mobile terminal 100 can be stationarily situated at a certain height h from the ground, and the sensing unit 140 can measure a gravitational force (gravity or gravitational acceleration) experienced by the mobile terminal 100. When the mobile terminal 100 is stationarily situated, the total gravitational force (gravity or gravitational acceleration) experienced by the mobile terminal 100, and more particularly, by the sensing unit 140 is 1 G (gravity) (i.e., 9.8 m/s$^2$). The gravity experienced by a stationarily situated object is 1 G according to classical physics, details of which are omitted for clarity of the present specification. Further, the gravitational force (gravity or gravity acceleration) experienced by the object is based on a reaction force attributed to the gravity generated between the object and Earth.

As the total gravity of the mobile terminal 100 is calculated by Formula 1 based on X-, Y- and Z-axis component outputs ($a_x$, $a_y$, $a_z$) sensed by the sensing unit 140, it can be constant irrespective of the orientation of the mobile terminal 100 (i.e., the housing of the mobile terminal 100).

$$a_{total} = \sqrt{a_x^2 + a_y^2 + a_z^2} \quad \text{Formula 1}$$

Referring to FIG. 7 (7-2), the mobile terminal 100 situated at the height h can fall free in the direction of gravity. The gravity experienced by the free-falling mobile terminal 100 becomes 0 G. Namely, the controller 180 of the mobile terminal 100 refers to a value of the gravity measured by the sensing unit 140 to determine whether the mobile terminal 100 is in the course of a free fall. The gravity experienced by a free-falling object is 0 G according to classical physics, details of which are omitted for clarity of the present specification. To help the understanding of 0 G, a passenger in a free-falling airplane can experience a state of non-gravitation (or weightlessness). In particular, because the passenger in the free-falling airplane is unable to receive a reaction force attributed the gravitation generated between the passenger and Earth, the passenger can experience the state of non-gravitation.

When the mobile terminal 100 falling free from the height h, as shown in FIG. 7 (7-3) arrives at the ground after elapse of a predetermined time t, the free fall ends. The gravity experienced by the mobile terminal 100 arriving at the ground becomes 1 G again. In addition, the relation between the predetermined height h and the predetermined time t can be expressed as Formula 2.

$$h = \tfrac{1}{2} g t^2 \qquad \text{Formula 2}$$

Thus, the free fall sensitivity of the sensing unit 140 in the mobile terminal 100 can be set by a terminal user in advance. This is described in detail with reference to FIG. 8 as follows.

Figure 8:
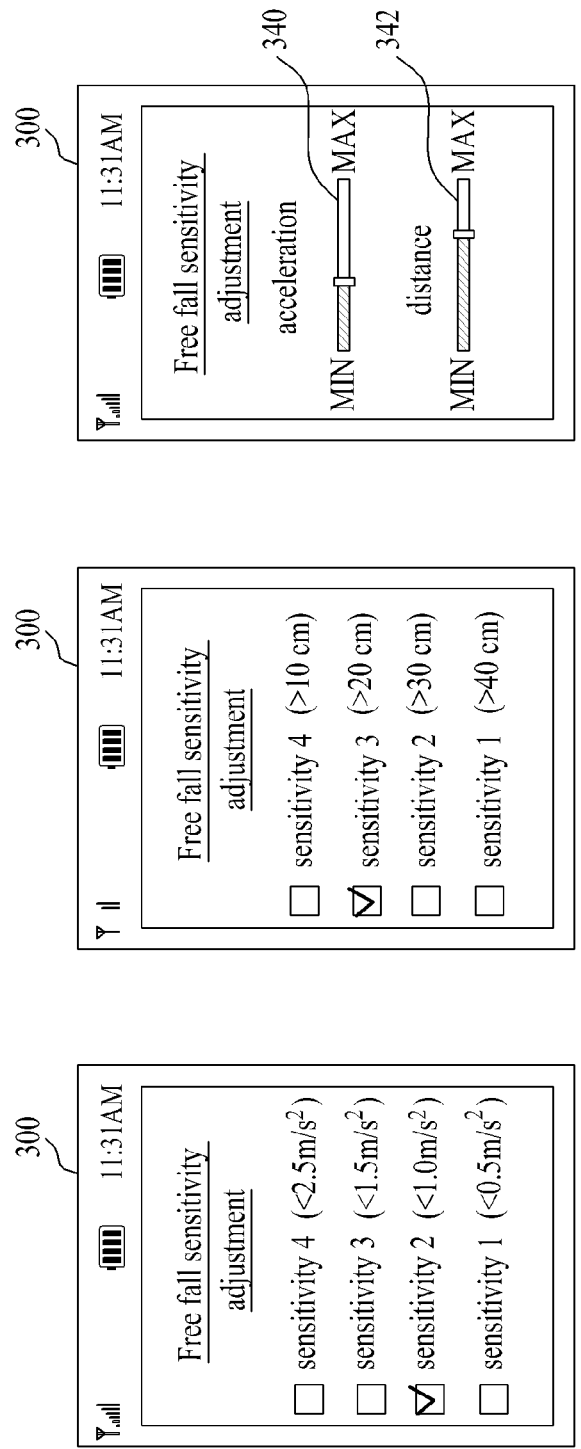
FIGS. 8 to 13 are diagrams of display screen configurations for implementing a method of controlling a mobile terminal according to one embodiment of the present invention.

FIG. 8 is a diagram of display screen configuration for implementing a method of controlling a mobile terminal according to one embodiment of the present invention.

Referring to FIG. 8, it is not necessary that the mobile terminal 100 should be regarded as being in the course of free fall only if the total gravity measured by the sensing unit 140 is exactly 0 G (i.e., 0 m/sec²). If the total gravity measured by the sensing unit 140 is equal to or greater than 0 m/sec² and smaller than a specific value, the controller 180 can regard the mobile terminal 100 as falling free. The higher the specific value gets, the better the free fall sensitivity becomes. The lower the specific value gets, the poorer the free fall sensitivity becomes.

Referring to FIG. 8 (8-1), a plurality of the gravity ranges, which can be regarded as free fall, are provided by the touchscreen 300 of the mobile terminal 100. If a terminal user touches to select a desired gravity range, the free fall sensitivity can be set. It is possible to set the free fall sensitivity to determine that the mobile terminal 100 is in the course of free fall if the gravity sensed by the sensing unit 140 ranges below a first specific gravity and over a second specific gravity (e.g., 0 G or higher). Alternatively, the free fall sensitivity can be set if a terminal user directly inputs a specific gravity range. Moreover, both of the first specific gravity and the second specific gravity can be set by a user in advance.

It is not mandatory for the free fall sensitivity to be determined according to the free fall sensitivity range. For instance, the free fall sensitivity can be determined with a distance h of free fall of the mobile terminal 100. In this instance, the free fall distance h can be calculated by Formula 2 by measuring a time t for regarding the mobile terminal 100 as being in the course of free fall.

Referring to FIG. 8 (8-2), a plurality of the free fall distance ranges, which can be regarded as free fall, are provided by the touchscreen 300 of the mobile terminal 100. If a terminal user touches to select a desired one of a plurality of the free fall distance ranges, the free fall sensitivity can be set. Alternatively, the free fall sensitivity can be set if a terminal user directly inputs a specific free fall distance range.

Moreover, the free fall sensitivity can be set in consideration of both of the gravity range and the free fall distance range. In particular, the free fall sensitivity can be set in a following manner. First of all, after both a desired gravity range and a desired free fall distance range have been set, if both (or any) of the set gravity range and the free fall distance range are met, the mobile terminal 100 is determined to be falling free.

Referring to FIG. 8 (8-3), a first slide bar 340 for setting the gravity range and a second slide bar 342 for setting the free fall distance range can be provided on the touchscreen 300 of the mobile terminal 100. Hence, a terminal user can set the free fall sensitivity in consideration of both a desired gravity range and a desired free fall distance range by touching and dragging the first slide bar 340 and the second slide bar 342.

When the mobile terminal falls on the ground, the impulse applied to the mobile terminal 100 can be reflected in both of the gravity and the free fall distance. When the mobile terminal 100 falls onto the ground, the mobile terminal 100 can experience gravity over 1 G. Hence, the free fall sensitivity of the mobile terminal 100 can be set with reference to the impulse applied to the mobile terminal 100 when the mobile terminal 100 falls onto the ground. For instance, the free fall sensitivity can be set in a following manner. First of all, the mobile terminal 100 falls in accordance with a specific gravitational acceleration in a direction of gravity. Thereafter, when the mobile terminal stops to generate an impulse over a specific value, it is determined that the mobile terminal 100 has experienced the free fall.

On the other hand, the sensing unit 140 of the mobile terminal can be set not to sense the free fall at all. In this instance, as the mobile terminal 100 enters an idle mode, when the main controller enters a sleep mode, the sub-controller can enter the sleep mode as well.

Figure 9:
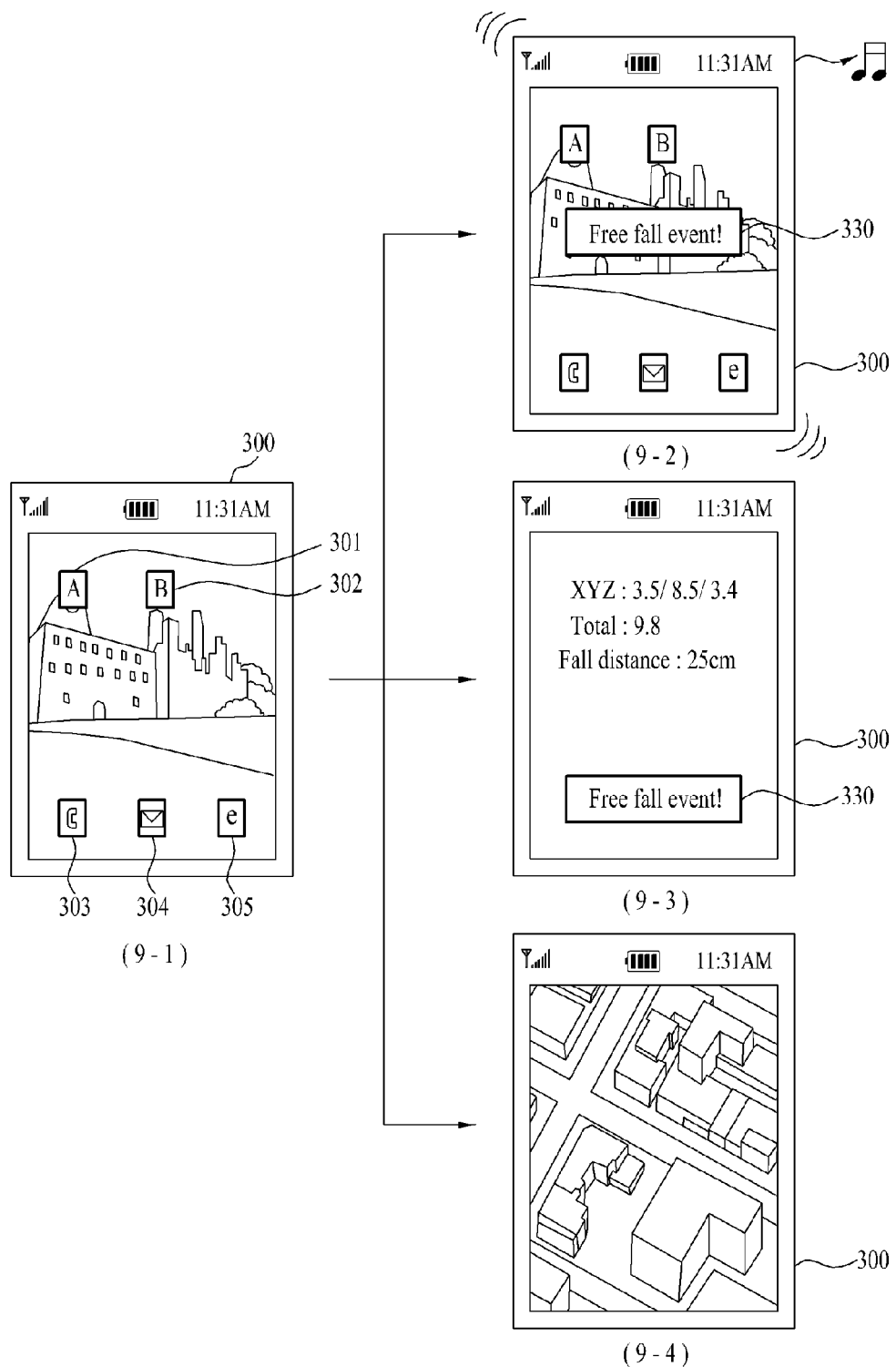

In the following description, utilization of a free fall event, in which the mobile terminal 100 falls free, is explained with reference to FIG. 9. In particular, FIG. 9 is a diagram of display screen configuration for implementing a method of controlling a mobile terminal according to one embodiment of the present invention.

As mentioned in the foregoing description, the free fall sensitivity can be set in the mobile terminal 100 (S61 in FIG. 6), which has been explained in the foregoing description.

If so, the controller 180 can detect that a free fall event, in which the mobile terminal 100 falls free in a gravity direction, has occurred in accordance with the set free fall sensitivity (S62). The controller 180 then executes a specific function in response to the detected free fall event (S63). Alternatively, whether to execute the specific function in response to the detected free fall event can be set by a user command input through the user input unit.

As the mobile terminal 100 enters an idle mode to minimize its power consumption, even if the main controller stays in a sleep mode, the sub-controller maintains an awake mode to enable the sensing unit to keep operating normally in the idle mode.

Therefore, even if the mobile terminal 100 is in the idle mode, the free fall event can be detected by the sensing unit 140 controlled by the sub-controller.

The executed specific function is described in detail as follows.

First of all, referring to FIG. 9 (9-1), the mobile terminal 100 is in a standby mode and a standby screen can be displayed on the touchscreen 300. Alternatively, the mobile terminal 100 can be in a lock mode or a specific application (e.g., a multimedia play application) can be in the course of execution. Alternatively, the mobile terminal 100 can be in an idle mode, in which a power supply to the touchscreen 300 is interrupted, despite that a power of the mobile terminal 100 is turned on. It may be assumed that unless there is special mention, before the occurrence of the free fall event, the mobile terminal 100 can be in the lock or idle state or executing a specific application.

In the above-mentioned situation, if the free fall event occurs, the controller 180 can detect the free fall event.

If so, referring to FIG. 9 (9-2), the controller 180 outputs an alarm graphic 330 to the touchscreen 180, indicating that the free fall event has occurred. Alternatively, the controller 180 can output, instead of (or together with) the alarm graphic 330, at least one of an alarm sound and an alarm vibration, indicating that the free fall event has occurred.

Referring to FIG. 9 (9-3), when the at least one of the alarm sound and the alarm vibration is output, the controller 180 outputs detailed information about the free fall event. In particular, the detailed information about the free fall event includes at least one of total gravity, gravity for each of X-, Y- and Z-axis components, fall distance, and fall time. The controller 180 can automatically save the detailed information about the free fall event in the memory 160.

Alternatively, referring to FIG. 9 (9-3), the controller 180 recognizes the free fall event as a specific user command. For example, FIG. 9 (9-3) shows that the controller 180 controls an image (e.g., a still image, a video, etc.), which is previously set for the free fall event, to be displayed on the touchscreen 300 in accordance with an occurrence of the free fall event. A preset audio can also be output instead of or together with, the previously set image.

When the free fall event occurs, the free fall event can be recognized as a different user command in accordance with the gravity or fall distance sensed by the mobile terminal in association with the free fall event. This is described in detail with reference to FIG. 10 as follows.

Figure 10:
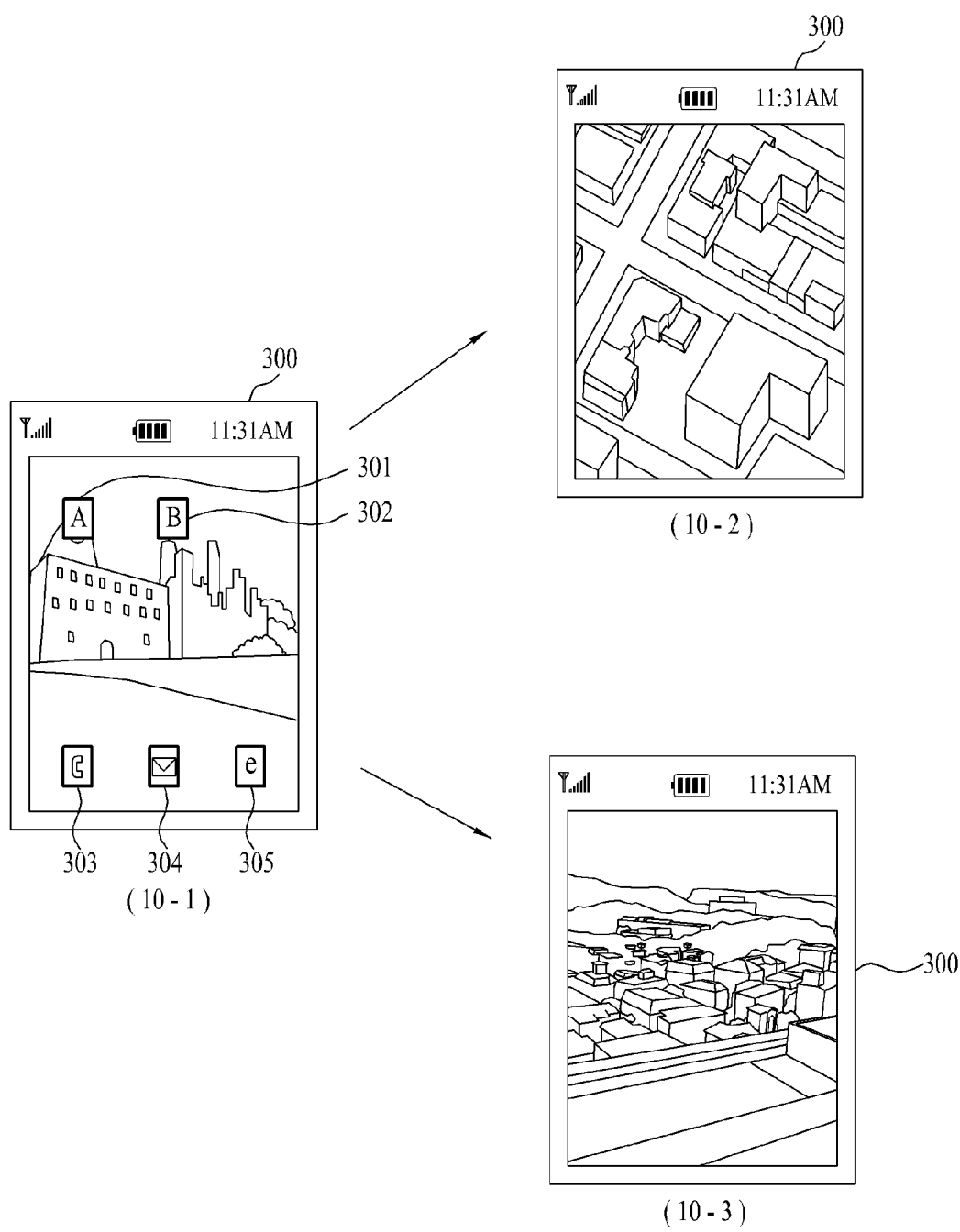

FIG. 10 is a diagram of a display screen configuration for implementing a method of controlling a mobile terminal according to one embodiment of the present invention. Referring to FIG. 10 (10-1), the mobile terminal 100 is in a standby mode and a standby screen is displayed on the touchscreen 300.

If a free fall event occurs, the controller 180 can detect the free fall event. Subsequently, the controller 180 can calculate a corresponding gravity or a corresponding fall distance of the free fall event.

If the controller 180 determines that the calculated gravity or the calculated fall distance is equal to or greater than a preset threshold value, the controller 180 can recognize the free fall event as a first user command.

For instance, referring to FIG. 10 (10-2), the controller 180 displays a first image on the touchscreen 300 in response to the first user command.

On the contrary, if the controller 180 determines that the calculated gravity or the calculated fall distance is smaller than the preset threshold value, the controller 180 can recognize the free fall event as a second user command. For instance, referring to FIG. 10 (10-3), the controller 180 displays a second image on the touchscreen 300 in response to the second user command.

The above-occurring free fall event can be recognized as a different user command in accordance with the gravity or fall distance sensed by the mobile terminal in association with the free fall event. This is described in detail with reference to FIG. 11 as follows.

Figure 11:
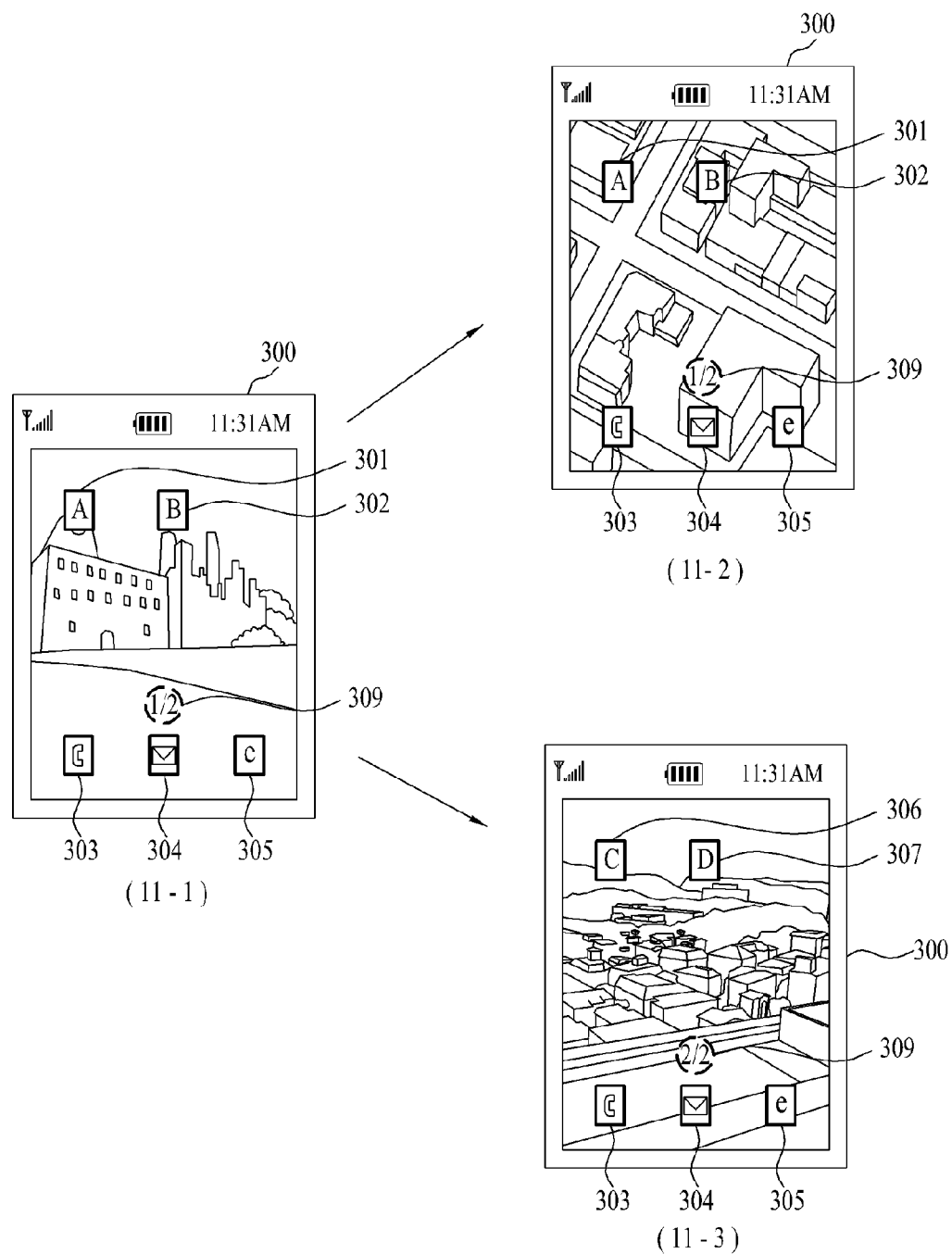

FIG. 11 is a diagram of a display screen configuration for implementing a method of controlling a mobile terminal according to one embodiment of the present invention. Referring to FIG. 11 (11-1), the mobile terminal 100 is in a standby mode, and a standby screen is displayed on the touchscreen 300. Assume that two home screens were previously prepared in the mobile terminal 100. In addition, assume that a first one of the two home screens is displayed as the standby screen.

First of all, a home screen indicator 309, which indicates that the first home screen of the two home screens is displayed, can be displayed on the touchscreen 300. In the drawing, an object A 301 and an object B 302 belong to the first home screen. A phone object 303, a message object 304 and an internet object 305, which are displayed on the touchscreen 300, may not belong to any home screen. In this instance, the 'object' conceptually includes one of an icon, widget, soft key, link, file and the like, which are displayed on the touchscreen 300.

If a free fall event occurs, the controller 180 detects the free fall event. Subsequently, the controller 180 calculates a corresponding gravity or a corresponding fall distance of the free fall event.

If the controller 180 determines that the calculated gravity or the calculated fall distance is equal to or greater than a preset threshold value, the controller 180 can recognize the free fall event as a first user command.

For instance, referring to FIG. 11 (11-2), the controller 180 keeps displaying a first home screen image on the touchscreen 300 in response to the first user command and changes a background image of the first home screen image into a different image. FIG. 11 (11-2) shows that a home screen indicator 309, which indicates that the first home screen is displayed, continues to be displayed on the touchscreen 300.

On the contrary, if the controller 180 determines that the calculated gravity or the calculated fall distance is smaller than a preset threshold value, the controller 180 can recognize the free fall event as a second user command.

For instance, referring to FIG. 11 (11-3), the controller 180 changes a first home screen image into a second home screen image in response to the second user command. FIG. 11 (11-3) shows that a home screen indicator 309, which indicates that the second home screen is displayed, is displayed on the touchscreen 300. In addition, an object C 307 and an object D 309 belong to the second home screen for example.

As mentioned in the above description, in accordance with the gravity or the free fall distance of the free fall event, the mobile terminal recognizes the free fall event as a different user command, by which the present embodiment is non-limited. For instance, in accordance with an aligned direction of a housing of the mobile terminal 100 in the course of the free fall event (e.g., whether a top or bottom side of the mobile terminal is facing downward in the course of the free fall), the mobile terminal recognizes the free fall event as a different user command. In more detail, the aligned direction of the housing of the mobile terminal 100 can be obtained by referring to a gravity for each of X-, Y- and Z-axis components sensed in the course of the free fall event. This can be fully understood from the above-mentioned description and the details are omitted from the following description for clarity.

In the following description, when a free fall event occurs, another example of a specific function previously set to be executed is explained in detail with reference to FIG. 12. In particular, FIG. 12 is a diagram of a display screen configuration for implementing a method of controlling a mobile terminal according to one embodiment of the present invention.

Figure 12:
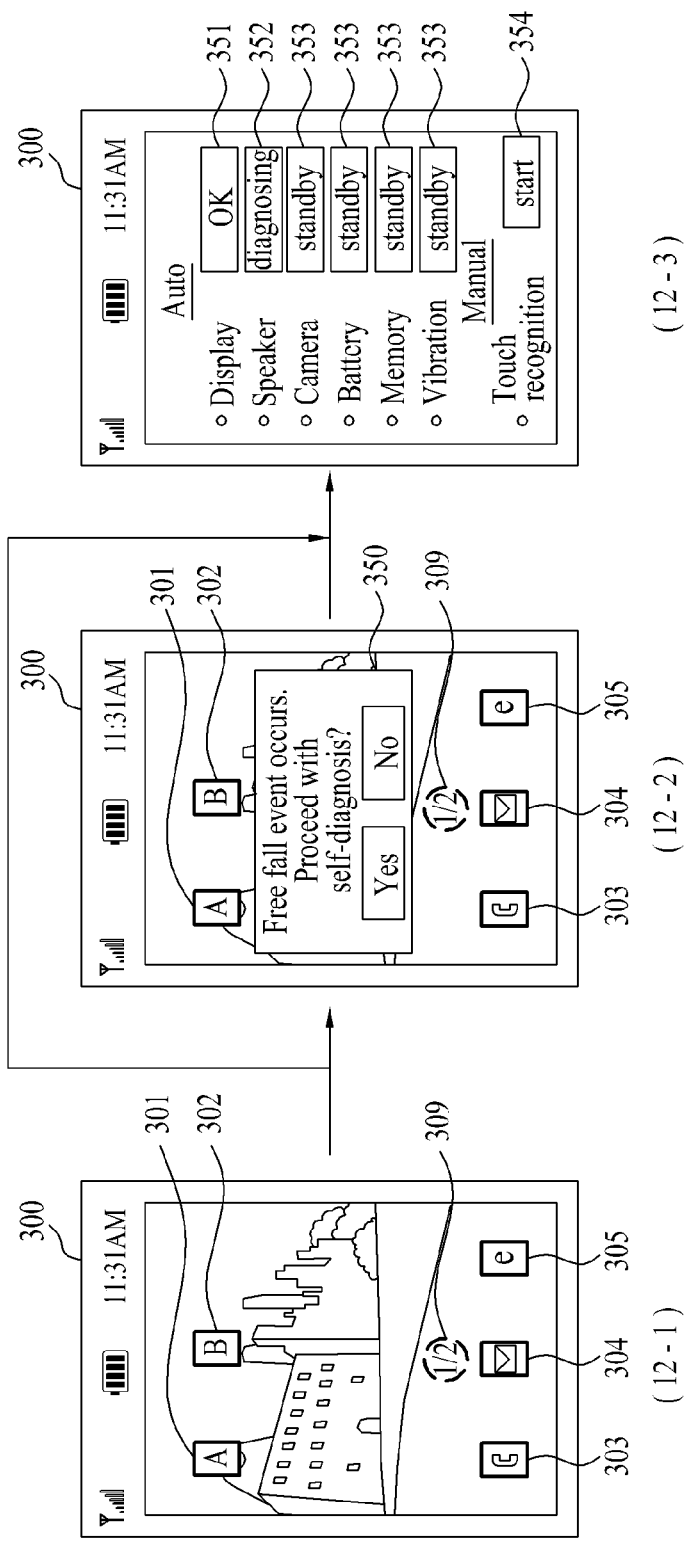

Referring to FIG. 12 (12-1), the mobile terminal 100 is in a standby mode and a standby screen is displayed on the touchscreen 300. If a free fall event occurs, the controller 180 detects the free fall event.

If so, referring to FIG. 12 (12-1), the controller 180 displays on the touchscreen 350 a self-diagnostic graphic 350 which queries whether a self-diagnostic (or self-examining)

application will be executed in response to the detected free fall event. In this instance, the self-diagnostic application means the application for automatically diagnosing whether each function of the mobile terminal 100 can be correctly executed.

If a user command for requesting to make the self-diagnosis proceed is input via the self-diagnostic graphic 350, referring to FIG. 12 (12-3), the controller 180 executes the self-diagnostic application of the mobile terminal 100. As the self-diagnostic application is executed, the functions of the mobile terminal 100 can be self-diagnosed in order.

For instance, in FIG. 12 (12-3), an indicator 'OK' 351 means that a corresponding function has no problem as a result of the diagnosis. An indicator 'processing diagnosis' 352 means that a corresponding function is being diagnosed, and an indicator 'standby' 352 means 'stand by for a diagnosis'.

Meanwhile, a range of the functions to be diagnosed by the self-diagnostic application can be adjusted in accordance with a gravity or a fall distance of the free fall event. For instance, if the gravity or fall distance of the free fall event is smaller than a predetermined value, the controller 180 controls functions in a first range to be self-diagnosed in order. In another instance, if the gravity or fall distance of the free fall event is equal to or greater than the predetermined value, the controller 180 controls functions in a second range to be self-diagnosed in order.

When the free fall event occurs, the controller 180 can also control the self-diagnostic application to be directly executed without displaying the self-diagnostic graphic 250. In addition, a diagnosis of a touch recognition function among the self-diagnosed functions can be performed by running parallel with a touch input made by a user. This is described in detail with reference to FIG. 13 as follows.

Figure 13:
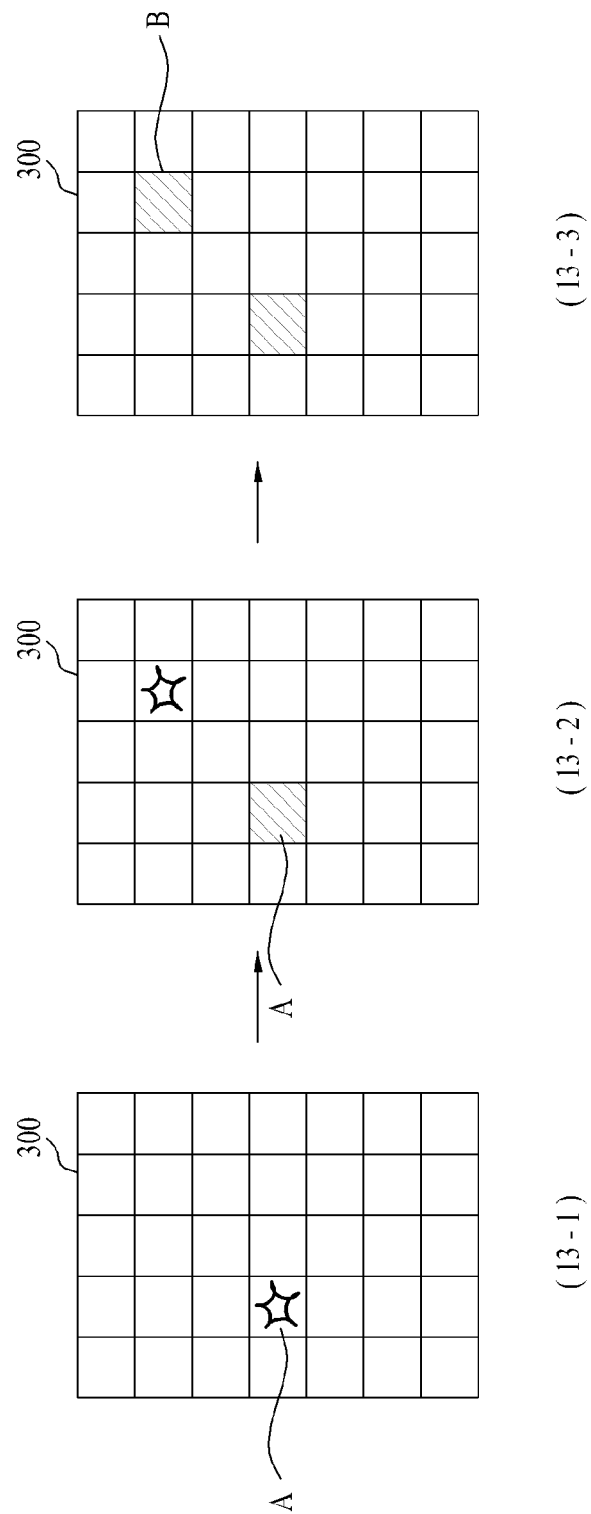

FIG. 13 is a diagram of display screen configuration for implementing a method of controlling a mobile terminal according to one embodiment of the present invention. As discussed in the description with reference to FIG. 12 (12-3), an icon 'start' 354 for initiating a manual diagnosis of the touch function can be displayed on the touchscreen 300.

If the icon 'start' 354 is touched and selected, referring to FIG. 13 (13-1), the controller 180 displays a touch function diagnosis screen on the touchscreen 300. In this instance, the touch function diagnosis screen can be configured as a grid constituted with a plurality of cells.

Thereafter, a cell A suspicious of a touch recognition failure among a plurality of the cells can be touched. When the controller 180 recognizes that the cell A has been touched, referring to FIG. 13 (13-1), the controller 180 changes a graphic in the cell A. Therefore, if a user checks that the graphic in the cell A changes, the user can confirm that the touch recognition of the cell A is normal.

Yet, when the controller 180 does not recognize that the cell A has been touched, the controller 180 does not change the graphic in the cell A. Therefore, if a user checks that the graphic in the cell A has not changed, the user can confirm that the touch recognition of the cell A fails.

Meanwhile, a cell B suspicious of a touch recognition failure among a plurality of the cells can be touched. When the controller 180 recognizes that the cell B has been touched, referring to FIG. 13 (13-3), the controller 180 changes a graphic in the cell B.

In the following description, another example of a specific function, which is preset to be executed in the mobile terminal 100 if the free fall event occurs, is explained in detail with reference to FIG. 14. In particular, FIG. 14 is a diagram for a configuration of LED dot matrix for implementing a method of controlling a mobile terminal according to one embodiment of the present invention.

Referring to FIG. 14 (14-1), an LED dot matrix 195 can be prepared in the mobile terminal 100 in advance. Although FIG. 14 (14-1) shows that a dot graphic is not displayed on the LED dot matrix 195, a prescribed dot graphic can be displayed in accordance with a function currently executed in the mobile terminal 100.

Thereafter, if a free fall event occurs, the controller 180 detects the free fall event. If so, referring to FIG. 14 (14-2), the controller 180 displays a preset dot graphic corresponding to the free fall event using the LED dot matrix 195.

Further, the controller 180 can display on the LED dot matrix 195 a dot graphic which has a size or shape varying in accordance with a gravity or a fall distance of the free fall event. Alternatively, the controller 180 can display a dot graphic on the LED dot matrix 195 by flickering in a cycle differing in accordance with a gravity or a fall distance of the free fall event.

Further, while a specific application or menu is being executed in the mobile terminal 100, if a free fall event occurs, a different function can be executed in the mobile terminal 100 in response to the occurring free fall event in accordance with the executed specific application or menu. This is described in detail with reference to FIG. 15 as follows.

Figure 15:
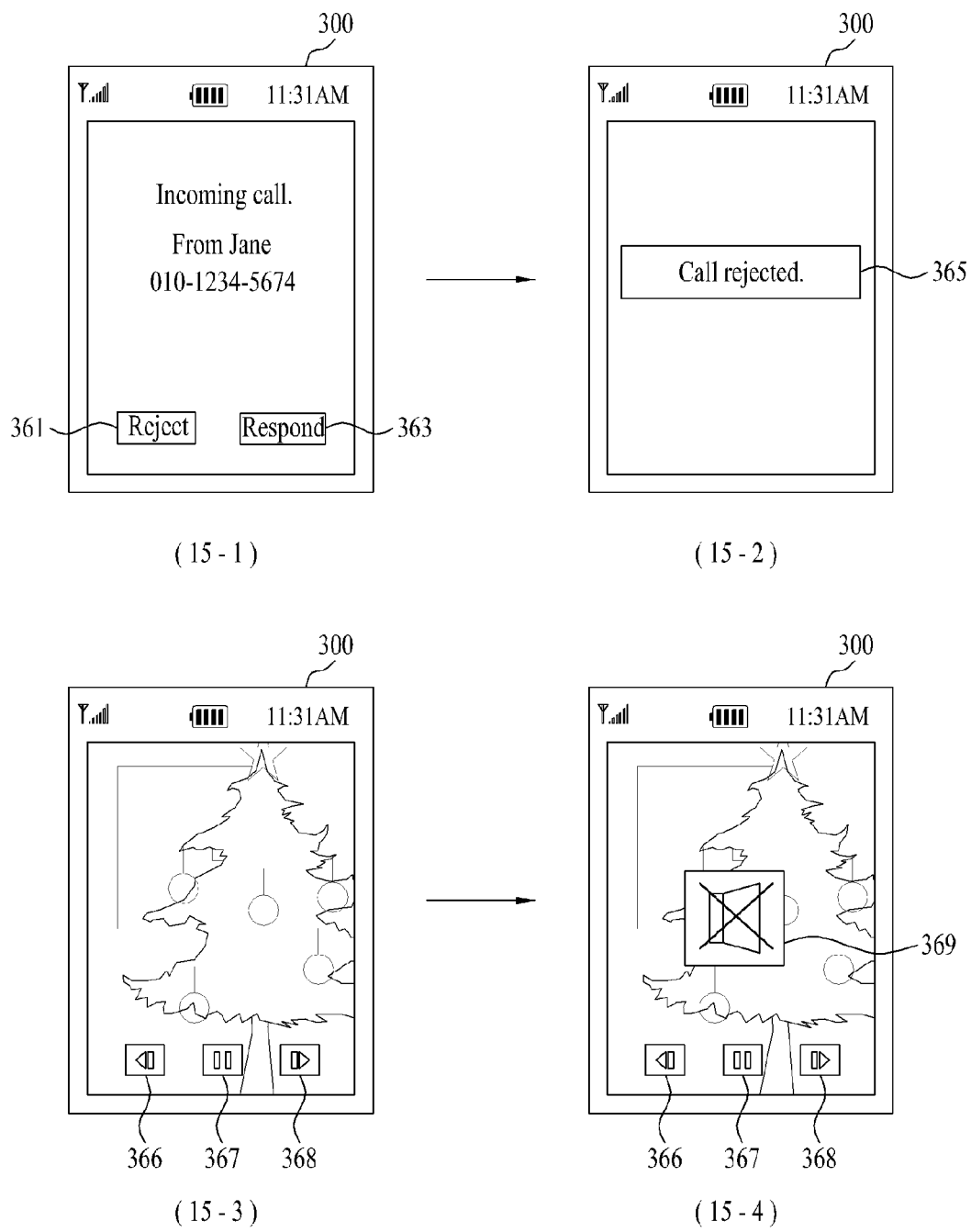
FIGS. 15 and 16 are diagrams of display screen configurations for implementing a method of controlling a mobile terminal according to one embodiment of the present invention.

FIG. 15 is a diagram of display screen configurations for implementing a method of controlling a mobile terminal according to one embodiment of the present invention. Referring to FIG. 15 (15-1), a phone call reception event can occur in the mobile terminal 100. As the phone call reception event occurs, the mobile terminal 100 displays a phone call reception image on the touchscreen 300 and can output a phone bell sound or a phone bell vibration.

In the phone call reception image, an icon 'reject' 361 for a call rejection and an icon 'response' 363 for a call connection can be displayed. Before a call connection to the received phone call is established, if a free fall event occurs, the controller 180 detects the free fall event.

If so, referring to FIG. 15 (15-2), the controller 180 can automatically reject the call connection of the phone call in response to the free fall event and also automatically transmit a message to a counterpart of the phone call, indicating that the call connection of the phone call is rejected due to the free fall event.

Alternatively, the controller 180 can automatically establish the call connection of the phone call in response to the free fall event. Alternatively, the controller 180 can automatically switch the received phone call to another preset communication device in response to the free fall event.

Meanwhile, referring to FIG. 15 (15-3), the mobile terminal is performing multimedia playback. The mobile terminal 100 also outputs a corresponding multimedia audio while displaying a corresponding multimedia image on the touchscreen 300. In doing so, icons 366, 367 and 368 for multimedia play manipulation are displayed in the corresponding multimedia image. If a free fall event occurs, the controller 180 detects the free fall event. If so, referring to FIG. 15 (15-4), the controller 180 automatically turns off the corresponding multimedia audio output in response to the free fall event while continuing to play the multimedia. Further, the controller 180 automatically stops the multimedia play in response to the free fall event.

In addition, while a morning call alarm function is executed in the mobile terminal 100, and if a free fall event occurs, the controller 180 can execute at least one of 'alarm-off' and 'snooze execution'.

In the following description, another example of a specific function, which is preset to be executed in the mobile terminal 100 if the free fall event occurs, is explained in detail with reference to FIG. 16. In particular, FIG. 16 is a diagram of display screen configurations for implementing a method of controlling a mobile terminal according to one embodiment of the present invention.

Figure 16:
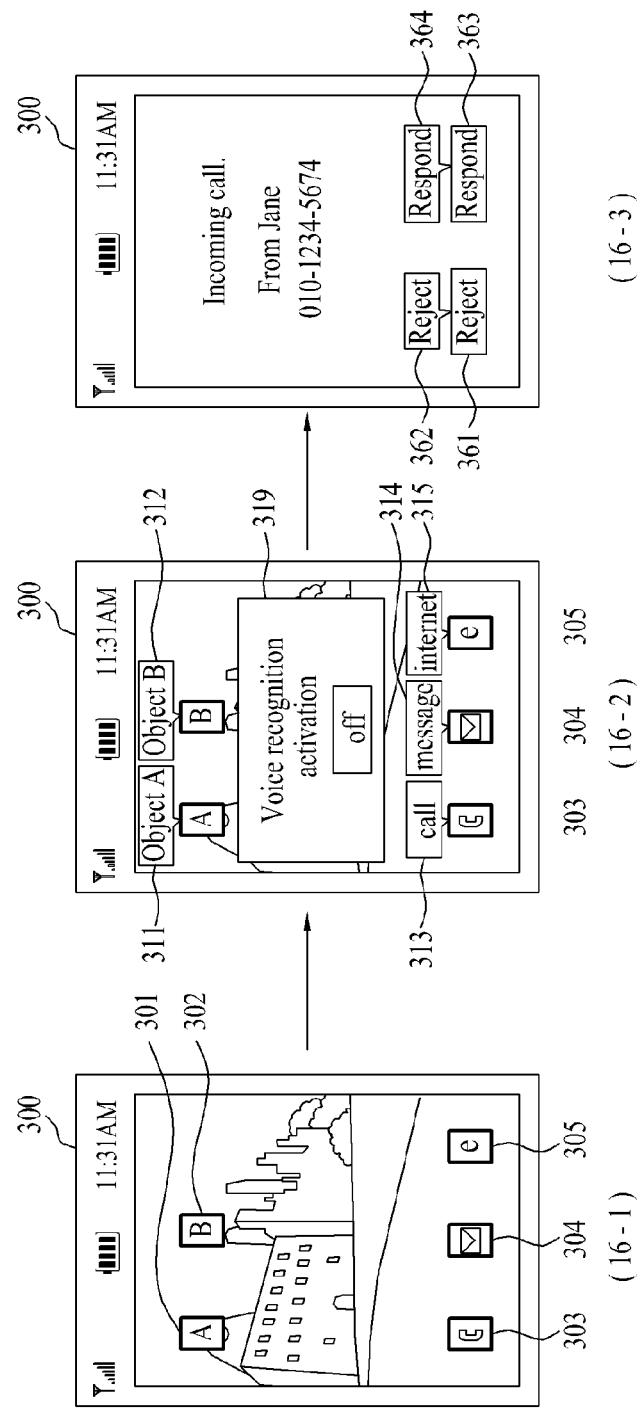

Referring to FIG. 16 (16-1), the mobile terminal 100 is in a standby mode and a standby screen is displayed on the touchscreen 300. Then, if a free fall event occurs, the controller 180 detects the free fall event.

If so, referring to FIG. 16 (16-2), the controller 180 can automatically execute a voice recognition application in response to the detected free fall event. This can be performed when a touch input may be unavailable due to the touchscreen being broken by the free fall event.

As the voice recognition application is automatically executed, the controller 180 displays a voice recognition graphic 319 on the touchscreen 300, indicating that the voice recognition application has been executed. If the touchscreen 300 is not broken despite the free fall event, the execution of the voice recognition application can be stopped or interrupted through a touch manipulation within the voice recognition graphic 319.

As the voice recognition application is executed, the controller 180 displays voice guide graphics 311 to 315, which correspond to at least one or more objects on the touchscreen 300, respectively. Therefore, if a terminal user inputs a voice via the microphone 122 in accordance with the voice guide graphic corresponding to a desired one of the objects, the controller 180 can execute the desired object, which corresponds to the input voice, by performing a prescribed voice recognition process.

Referring to FIG. 16 (16-3), while the voice recognition application is being executed, a phone call reception event can occur in the mobile terminal 100. As the phone call reception event occurs, the mobile terminal 100 can display a phone call reception image on the touchscreen 300. The controller 180 can also display voice guide graphics 362 and 364, which correspond to at least one or more objects 361 and 363 within the phone call reception image, respectively.

In the following description, another example of a specific function, which is preset to be executed in the mobile terminal 100 if the free fall event occurs, is explained in detail with reference to FIG. 17. In particular, FIG. 17 is a diagram of a mobile terminal for implementing a method of controlling the mobile terminal according to one embodiment of the present invention.

Figure 17:
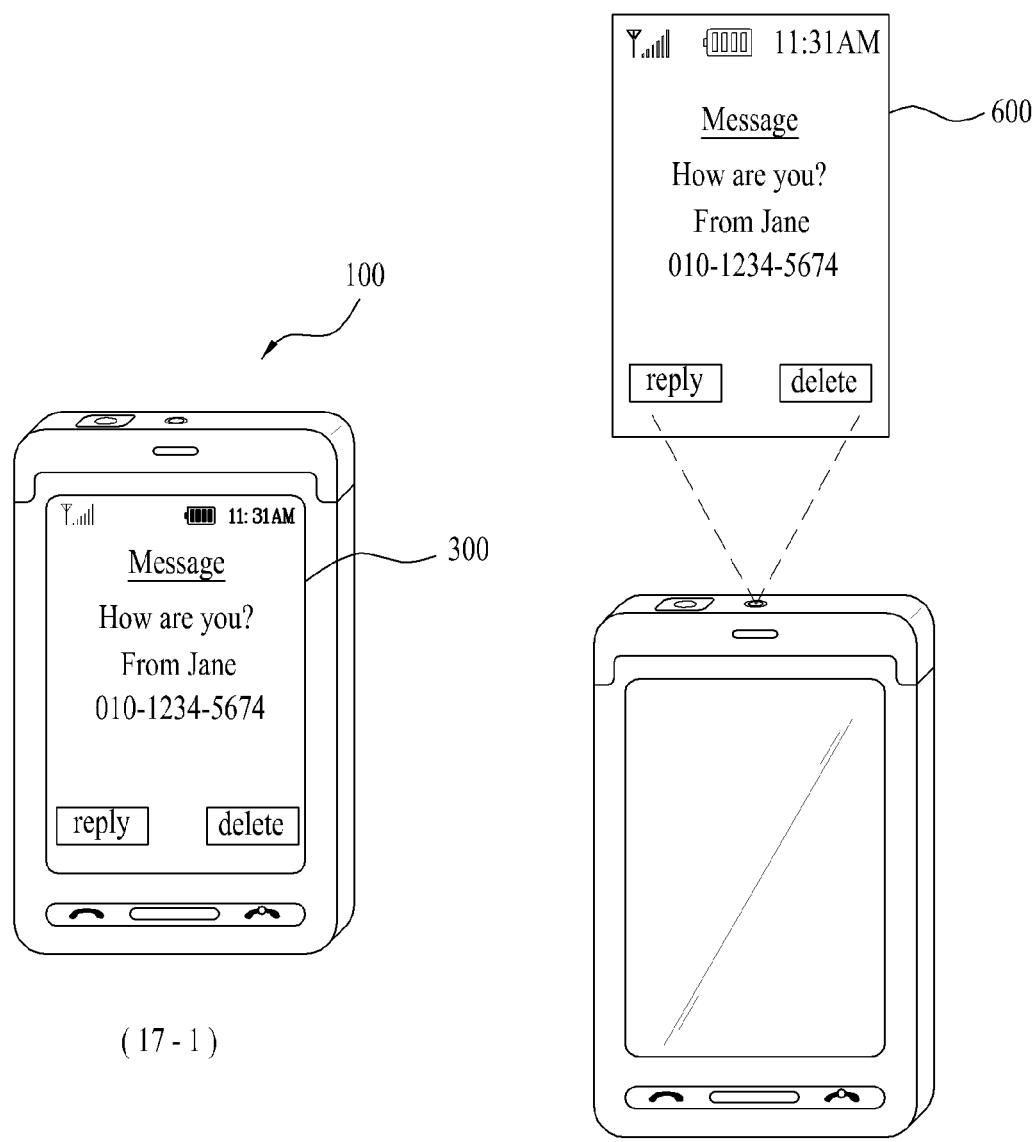
FIGS. 17 to 19 are diagrams of a mobile terminal for implementing a method of controlling the mobile terminal according to one embodiment of the present invention.

Referring to FIG. 17 (17-1), the mobile terminal 100 is executing a message menu, and a received message is then displayed on the touchscreen 300. If a free fall event occurs, the controller 180 detects the free fall event.

Thus, referring to FIG. 17 (17-2), in response to the detected free fall event, the controller 180 projects the message displayed on the touchscreen 300 on an external plane via the projector module 155 by automatically activating the projector module 155. In particular, the message displayed on the touchscreen 300 can be displayed on a projected image on the external plane as it is. This enables a user to continue to view the message via the projected image 600 even if it is not possible to display the message due to the damage caused to the touchscreen 300 by the free fall event.

In the description with reference to FIG. 17, while the message menu is being executed in the mobile terminal 100, if the free fall event occurs, the corresponding message is displayed as the projected image, by which the present embodiment is non-limited. In particular, although a kind of menu or application (e.g., a multimedia play menu, a phone call menu, etc.) is being executed in the mobile terminal 100, and if a free fall event occurs, a corresponding menu or application image can be displayed as a projected image.

In the following description, another example of a specific function, which is preset to be executed in the mobile terminal 100 if the free fall event occurs, is explained in detail with reference to FIG. 18. In particular, FIG. 18 is a diagram of a mobile terminal for implementing a method of controlling the mobile terminal according to one embodiment of the present invention.

Figure 18:
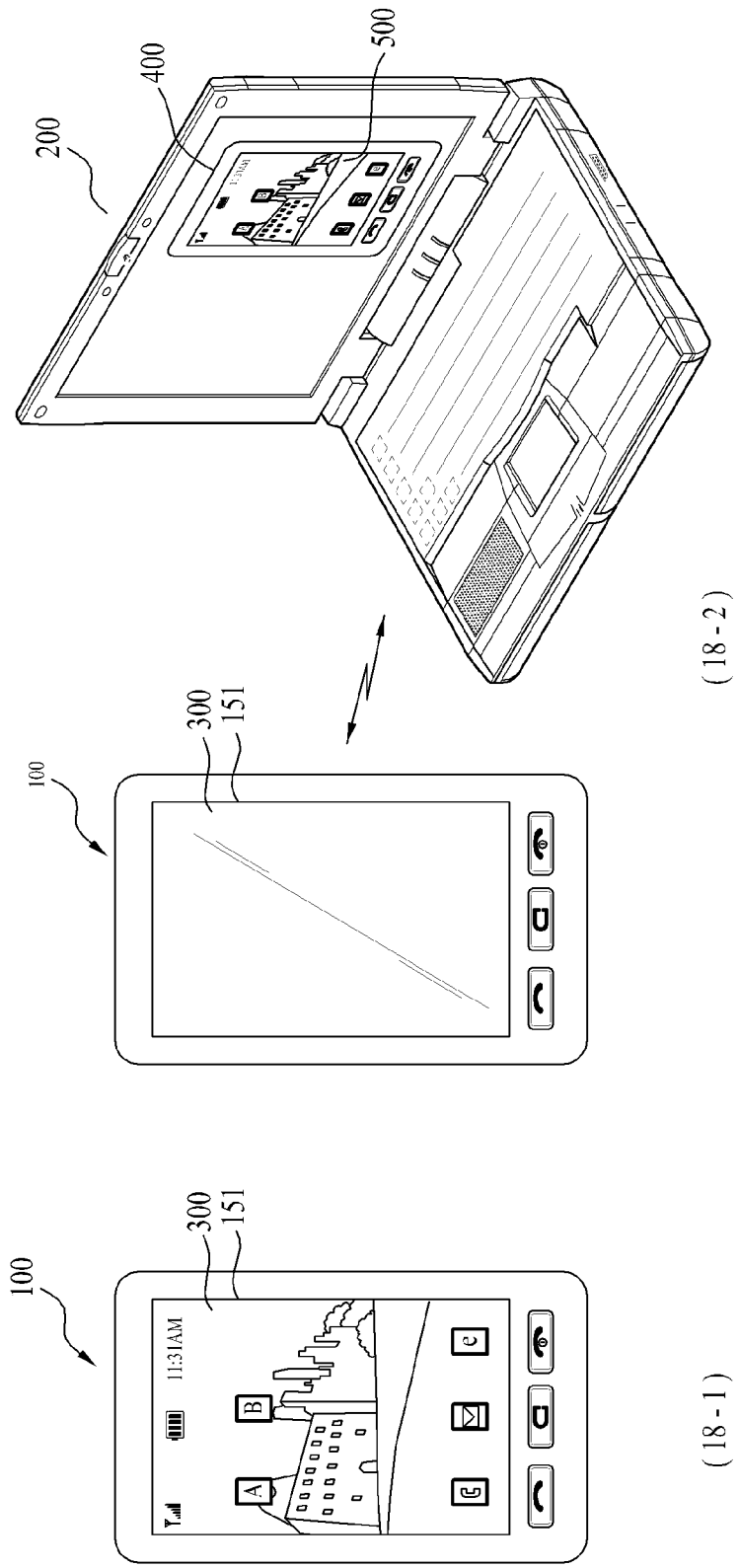

Referring to FIG. 18 (18-1), the mobile terminal 100 is in a standby mode, and a standby screen is displayed on the touchscreen 300. If a free fall event occurs, the controller 180 detects the free fall event.

If so, referring to FIG. 18 (18-2), the controller 180 automatically connects the mobile terminal 100 to the external display device 200 in response to the detected free fall event. In this instance, information about (or an identifier of) the external display device to be automatically connected to the mobile terminal 100 in the event of the free fall, can be previously set and stored in the mobile terminal 100.

Once the connection between the mobile terminal 100 and the display device 200 is established, the mobile terminal 100 provides the external display device 200 with information about a first screen image displayed on the touchscreen 300 (i.e., the first display unit 151).

Hence, when the mobile terminal 100 and the display device 200 are connected, the second controller 280 of the display device 200 displays a monitor window 400 for the first screen image on the second display unit 251. The second controller 280 of the display device 200 also displays an image corresponding to the first screen image, i.e., a second screen image 500, on the monitor window 400.

As the monitor window 400 is explained in the foregoing description, its details are omitted from the following description.

Therefore, a user can indirectly manipulate the mobile terminal 100 by manipulating the monitor window 400 on the display device instead of directly manipulating the mobile terminal 100. In addition, the user can view the first screen image 300 of the indirectly manipulated mobile terminal 100 via the second screen image 500 displayed on the display device 200.

This enables a user to indirectly manipulate the mobile terminal 100 by watching an image via the monitor window 400 of the external display device 200 even if the corresponding image is not displayable due to the touchscreen of the mobile terminal 100 broken by the free fall event.

In the following description, another example of a specific function, which is preset to be executed in the mobile terminal 100 if the free fall event occurs, is explained in detail with reference to FIG. 19. In particular, FIG. 19 is a diagram of a mobile terminal for implementing a method of controlling the mobile terminal according to one embodiment of the present invention.

Figure 19:
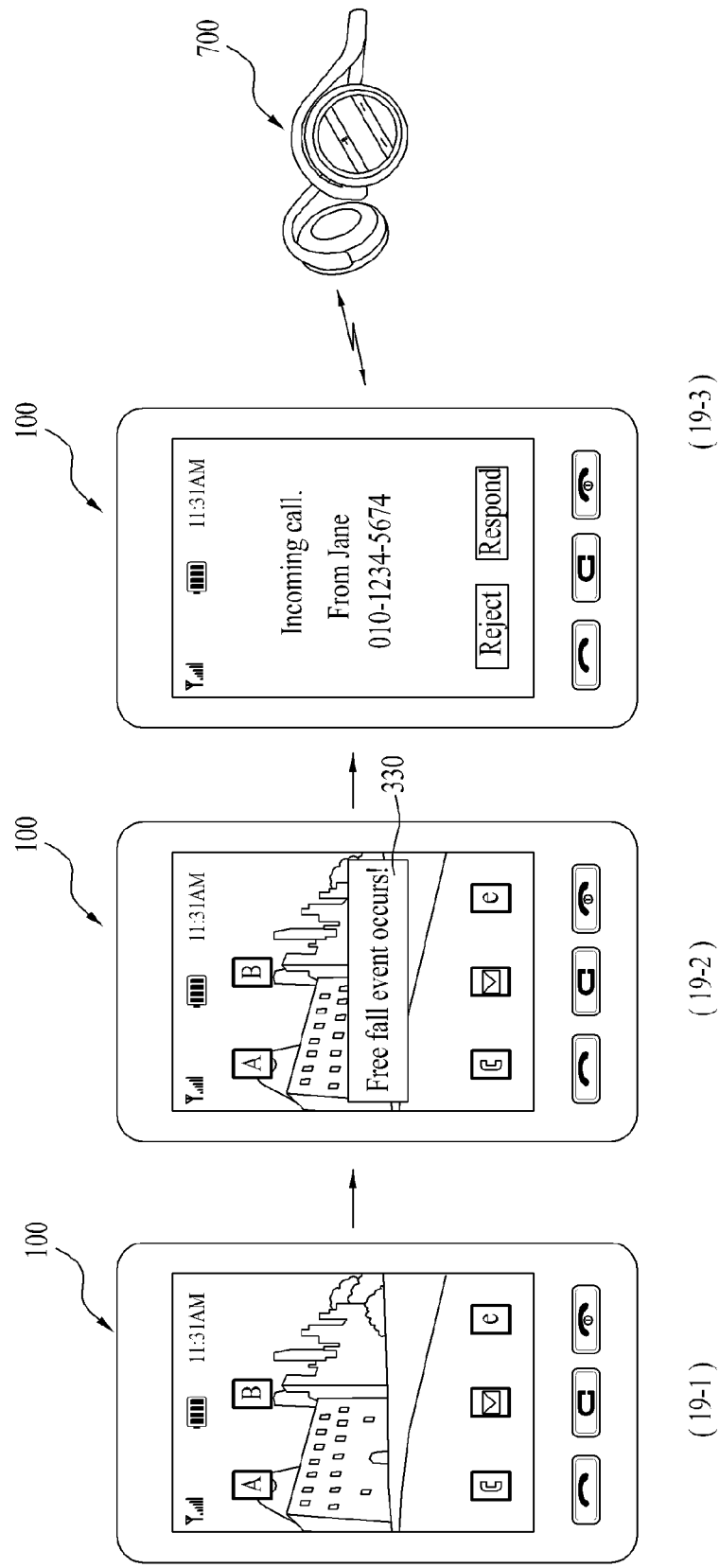

Referring to FIG. 19 (19-1), the mobile terminal 100 is in a standby mode and a standby screen is displayed on the touchscreen 300. If a free fall event occurs, the controller 180 detects the free fall event.

If so, referring to FIG. 19 (19-2), the controller 180 outputs an alarm graphic 330 to the touchscreen 300, indicating the free fall event has occurred.

Referring to FIG. 19 (19-3), a phone call reception event can occur in the mobile terminal 100. As the phone call reception event has occurred, the mobile terminal 100 displays a phone call reception image on the touchscreen 300 and outputs a phone bell sound or a phone bell vibration.

In response to the free fall event and the phone call reception event, the controller 180 can automatically connect the mobile terminal 100 to a wireless headset (or earphone) 700. In particular, the mobile terminal 100 can be connected to the wireless headset 700 via short-range communication such as Bluetooth and the like.

Information about (or an identifier of) the headset 700 to be automatically connected to the mobile terminal 100 in the event of the free fall and the phone call reception, can be previously stored in the mobile terminal 100.

Therefore, as the touchscreen of the mobile terminal 100 is broken by the free fall event, even if a touch recognition is not available, the controller 180 can establish a call connection of the phone call via the automatically connected headset 700.

Figure 20:
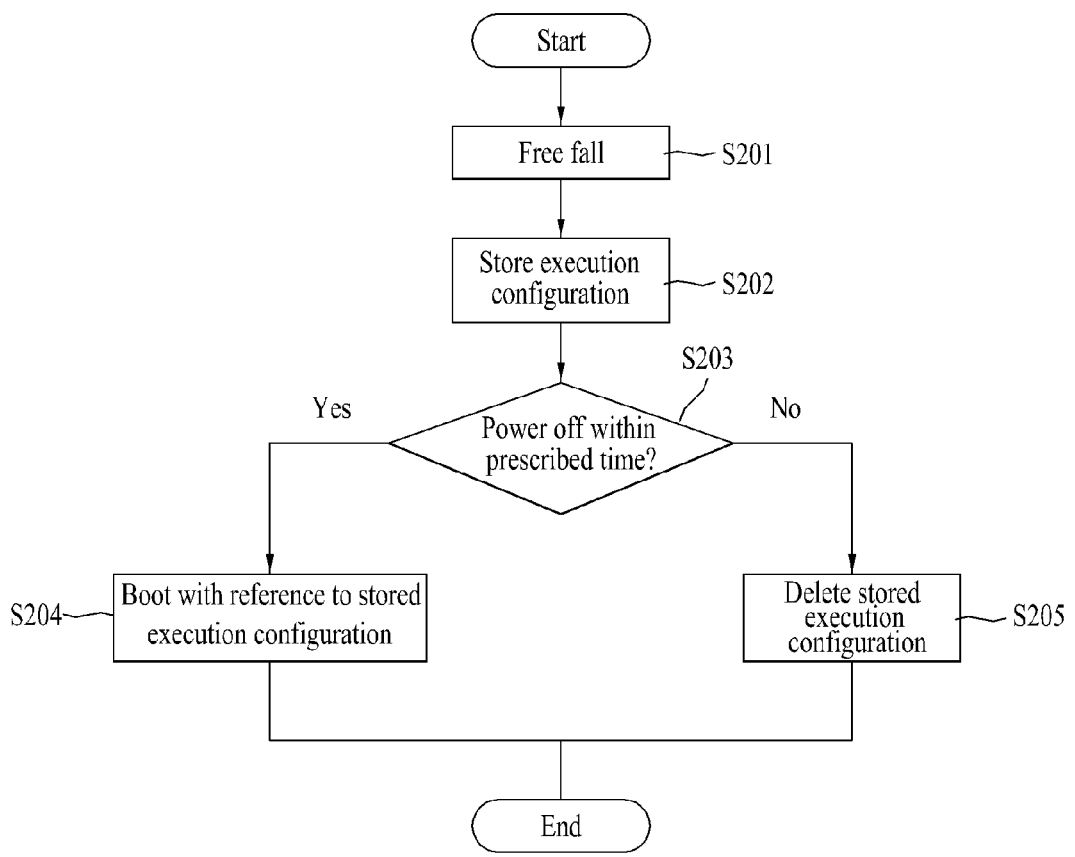
FIG. 20 is a flowchart for a method of controlling a mobile terminal according to another embodiment of the present invention.

In the following description, another example of a specific function, which is preset to be executed in the mobile terminal 100 if the free fall event occurs, is explained in detail with reference to FIGS. 20 and 21. In particular, FIG. 20 is a flowchart for a method of controlling a mobile terminal, and FIG. 21 is a diagram for the concept of free fall of a mobile terminal according to another embodiment of the present invention.

Figure 21:
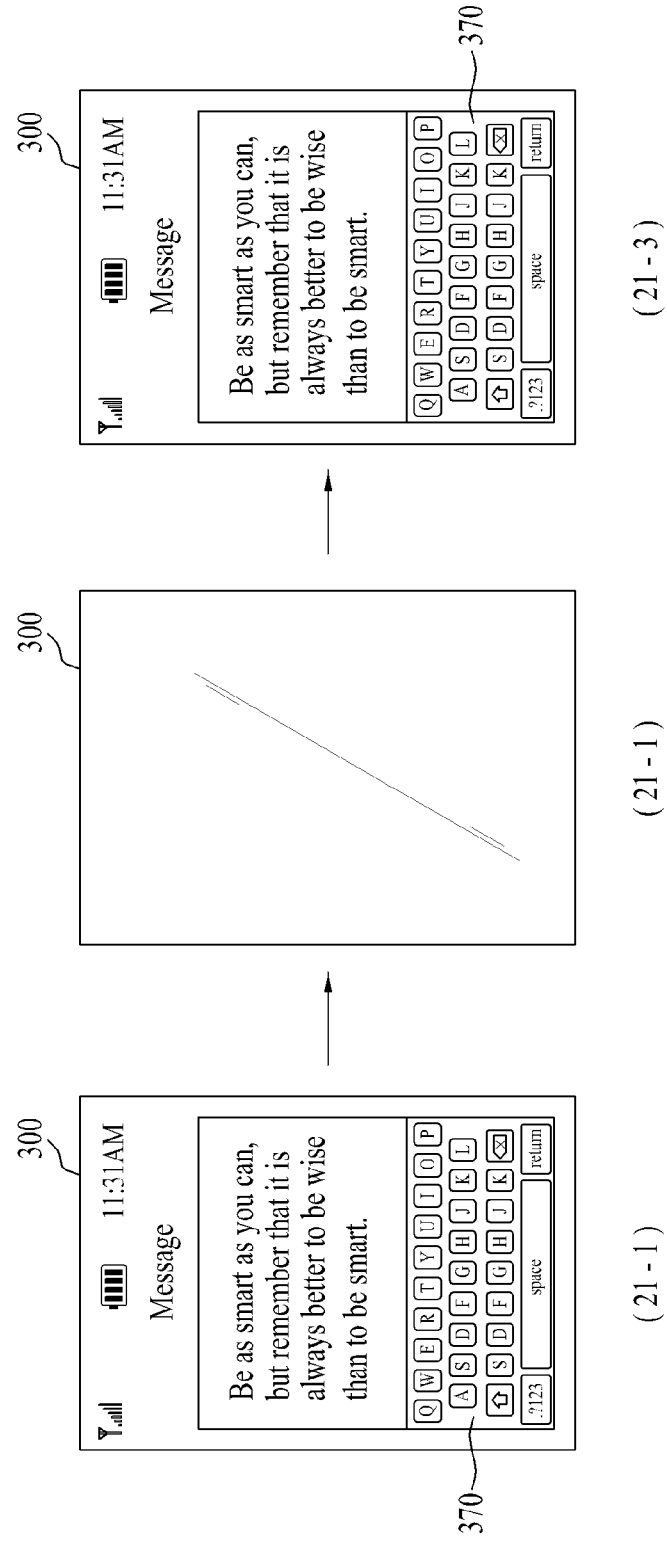
FIG. 21 is a diagram for the concept of free fall of a mobile terminal according to one embodiment of the present invention.

Referring to FIG. 21 (21-1), the mobile terminal 100 is executing a message menu. Hence, a message, which is being written by a user, is displayed on the touchscreen 300. If a free fall event occurs, the controller 180 detects the free fall event (S201).

If so, when the free fall event occurs, the controller 180 stores an execution configuration of the mobile terminal 100 in the memory 160 (S202). In this instance, the execution configuration can contain information about jobs (i.e., menus in progress, applications in progress, etc.) being executed in the mobile terminal 100 at the time of the free fall event occurs, as well as display information of the touchscreen 300.

Subsequently, the controller 180 determines whether a power of the mobile terminal 100 is turned off within a prescribed time from a timing point of the free fall event occurrence (S203). As a result of the determination, referring to FIG. 21 (21-2), if the power of the mobile terminal 100 is turned off within the prescribed time, the controller 180 can automatically turn on the power of the mobile terminal 100 again by referring to the stored execution configuration (S204).

Therefore, referring to FIG. 21 (21-3), when the power is turned on again, the controller 180 resumes executing the jobs which were being executed in the mobile terminal 100 when the free fall event occurred. In addition, when the power is turned on again, the controller 180 resumes displaying the information which was being displayed on the touchscreen 300 when the free fall event occurred.

On the contrary, as a result of the determination, if the power of the mobile terminal 100 is not turned off within the prescribed time, the controller 180 ignores the stored execution configuration. As the execution configuration is ignored, the controller 180 can automatically delete the stored execution configuration (S205).

In the following description, another example of a specific function, which is preset to be executed in the mobile terminal 100 if the free fall event occurs, is explained in detail with reference to FIG. 22. In particular, FIG. 22 is a diagram of a mobile terminal for implementing a method of controlling the mobile terminal according to one embodiment of the present invention.

Figure 22:
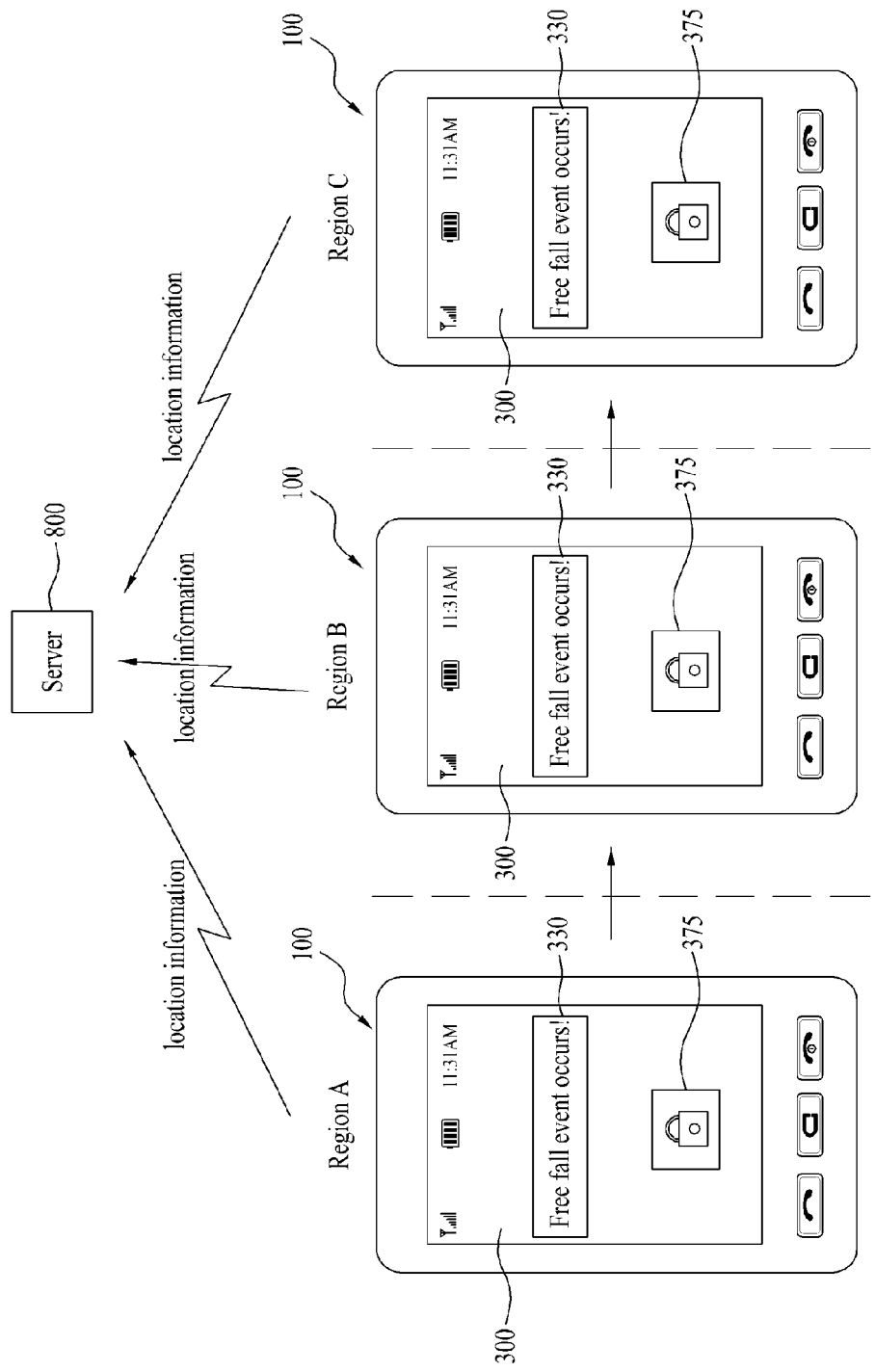
FIGS. 22 and 23 are diagrams of a mobile terminal for implementing a method of controlling a mobile terminal according to one embodiment of the present invention.

Referring to FIG. 22, while the mobile terminal 100 is located in a region A, a free fall event can occur. If so, the controller 180 outputs an alarm graphic 330 to the touchscreen 300, indicating that the free fall event has occurred.

The controller 180 can also automatically execute a lock function. In this instance, the lock function is a function for preventing the mobile terminal 100 from being used by other users without authorization in advance. The controller 180 can also unlock or cancel the lock function if a preset password is input via the user input unit 130.

As the lock function is executed, the controller 180 can display a lock graphic 375 on the touchscreen 300, indicating that the lock function has been executed.

The controller 180 calculates location information (i.e., information of the region A) of the mobile terminal 100 when the free fall event occurs using the position location module 115 and automatically transmits the calculated location information to an external server 800. This enables a terminal user to check a lost location of the mobile terminal 100 by accessing the external server 800 if the mobile terminal 100 is lost.

The controller 180 can transmit detailed information about the free fall event to the external server 800 together with the calculated location information. In addition, the controller 180 can store at least one of the location information and the free fall event detailed information in the memory 160.

Using the calculated location information, the controller 180 can display on the touchscreen 300 information (e.g., address and/or phone number, etc.) about a terminal service center which is nearest to a location where the free fall event occurred. In this instance, the terminal service center information can be previously stored in the memory 160. Alternatively, the mobile terminal 100 can obtain the terminal service center information by accessing the external server 800.

As the mobile terminal 100 moves away into another location, the controller 180 can check whether the location information is changed. Each time the location information is changed over a predetermined distance, the controller 180 can automatically transmit the changed location information to the external server 800. In particular, each time the mobile terminal 100 moves away into a different region (e.g., region A to region B, region B to region C, etc.), a corresponding location of the mobile terminal 100 can be automatically transmitted to the external server 800.

Even if the location information of the mobile terminal 100 is not changed, the controller 180 can automatically and periodically transmit the location information of the mobile terminal 100 to the external server 800.

In the following description, another example of a specific function, which is preset to be executed in the mobile terminal 100 if the free fall event occurs, is explained in detail with reference to FIG. 23. In particular, FIG. 23 is a diagram of a mobile terminal for implementing a method of controlling the mobile terminal according to one embodiment of the present invention.

Figure 23:
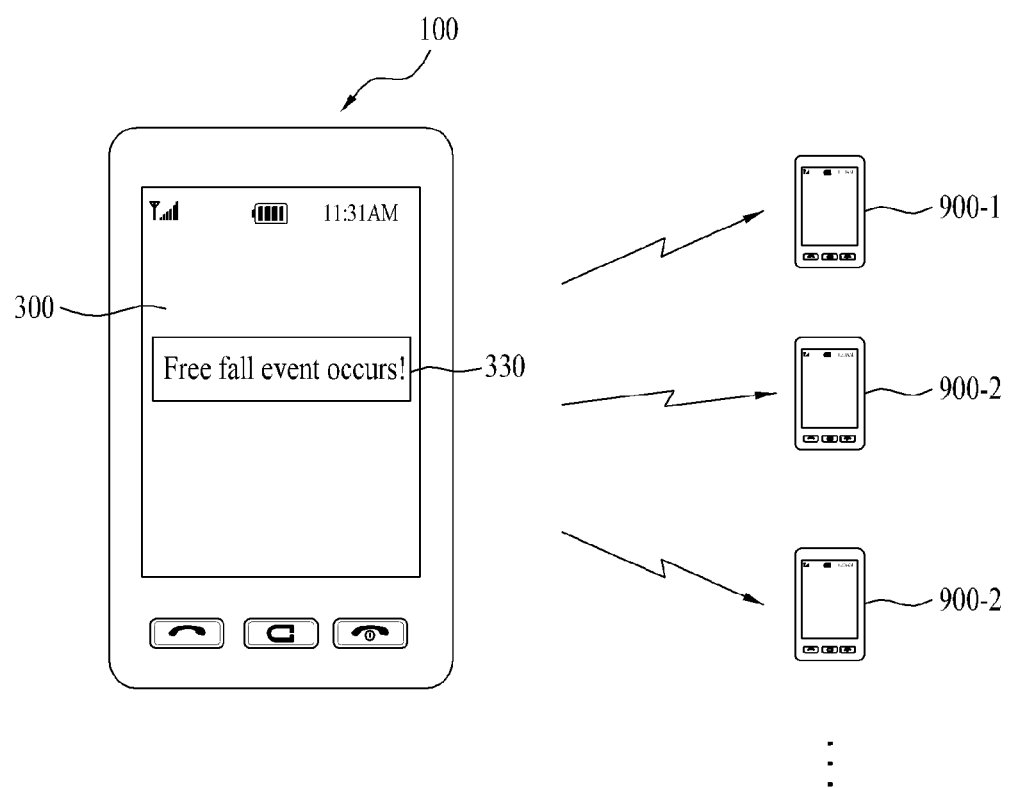

Referring to FIG. 23, while the mobile terminal 100 is located in a region A, a free fall event can occur. If so, the controller 180 outputs an alarm graphic 330 to the touchscreen 300, indicating that the free fall event has occurred.

Further, the controller 180 automatically transmits a message to at least one or more preset counterpart terminals 900-1, 900-2 and 900-3, indicating that the free fall event has occurred. This automatically informs the preset counterpart terminals of a possible crisis (or emergency) situation of a user of the mobile terminal in which the free fall event may occur, especially if the user is performing a dangerous activity such as rock climbing or any other hazardous undertaking.

Accordingly, the present invention provides several advantages. First of all, according to at least one of the embodiments of the present invention, if a user drops the mobile terminal intentionally or unintentionally, such an event can be utilized for a user to use a terminal.

For instance, a mobile terminal dropped event caused by a user is recognized as a specific user command, whereby various commands can be input despite the fact that a limited user input unit is provided to the mobile terminal.

Secondly, if a user drops a mobile terminal, the present invention recognizes such an event as a user's mistake and then provides follow-up measures, thereby enabling the user to prepare for terminal failure or loss.

Thirdly, in the event that a user drops a mobile terminal, the present invention estimates whether the event occurs intentionally or unintentionally by the user with reference to a fall distance of the mobile terminal for example. As a result of the estimation, the present invention recognizes the event as a specific user command or a user's mistake and can then provide corresponding follow-up measures.

It will be apparent to those skilled in the art that various modifications and variations can be specified into other form(s) without departing from the spirit or scope of the inventions.

In accordance with whether the mobile terminal 100 is in one of a lock mode, an idle mode and a specific application executed mode before an occurrence of a free fall event, a specific function, which is executed in the event of the free fall, can be changed.

Moreover, in accordance with whether the mobile terminal 100 is in one of a lock mode, an idle mode and a specific application executed mode before an occurrence of a free fall event, it is possible to determine whether to execute a specific function when the free fall event occurs.

The above-described methods can be implemented in a program-recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touchscreen configured to display information and receive touch inputs;
a sensor unit configured to detect a gravity characteristic of the mobile terminal; and
a controller configured to output a user-settable gravity sensitivity threshold option for setting a gravity detecting sensitivity of the sensor unit, to receive a selection signal indicating a selection of a first gravity sensitivity threshold, to determine the mobile terminal is in a state of falling when the detected gravity characteristic of the mobile terminal is less than or equal to the selected first gravity sensitivity threshold, and to execute a predetermined function mapped to the determined falling state,
wherein the executed predetermined function includes executing a terminal diagnostic function on the mobile terminal, and
wherein the controller is further configured to vary a diagnostic range of the terminal diagnostic function in accordance with at least one of the detected gravity characteristic of the mobile terminal and a detected height at which the mobile terminal fell from.

2. The mobile terminal of claim 1, wherein the controller is further configured to detect an amount of time the mobile terminal is in the falling state, and to only execute the predetermined function when the detected amount of time is greater than or equal to a set time threshold.

3. The mobile terminal of claim 1, wherein the controller is further configured to detect an impulse characteristic of the mobile terminal hitting an object after the free falling state, and to only execute the predetermined function when the detected impulse characteristic is equal to or greater than a set impulse threshold.

4. The mobile terminal of claim 2, wherein the controller is further configured to detect an orientation of the mobile during the determined falling state, and
wherein when the detected gravity characteristic of the mobile terminal is less than or equal to the selected first gravity sensitivity threshold, the controller is further configured to perform at least one of 1) executing the specific function irrespective of the detected orientation of the mobile terminal, 2) executing the specific function in further consideration of the detected orientation of the mobile terminal, and 3) executing a different specific function based on the detected orientation of the mobile terminal.

5. The mobile terminal of claim 1, wherein the controller is further configured to detect an amount of time the mobile terminal is in the falling state, and to execute either the predetermined function or a different predetermined function based on the detected amount of time.

6. The mobile terminal of claim 1, wherein the executed predetermined function further includes at least one of 1) displaying an alarm image on the touchscreen, 2) outputting an alarm sound, 3) outputting an alarm vibration, and 4) turning on and off preset LED lights included in a dot matrix on the mobile terminal.

7. The mobile terminal of claim 6, wherein the controller is further configured to display a grid constituted with a plurality of cells on the touchscreen for a diagnosing touch recognition function, and change a graphic in a cell when the cell is touched and the touchscreen recognizes the touch of the cell.

8. The mobile terminal of claim 1, wherein the executed predetermined function includes at least one of 1) rejecting an incoming call, 2) turning a volume output off in the course of a multimedia playback, and 3) turning off or snoozing an alarm.

9. The mobile terminal of claim 1, wherein the executed predetermined function includes at least one of 1) executing a voice recognition function, 2) executing a projector function, 3) connecting to an external device, 4) transmitting a message to at least one other terminal, and 5) storing a current terminal execution configuration of the mobile terminal.

10. The mobile terminal of claim 1, further comprising:
a position location module configured to determine a current location of the mobile terminal,
wherein the executed predetermined function includes determining the current location of the mobile terminal, and outputting information concerning a terminal service center which is nearest from the calculated current terminal location.

11. A method of controlling a mobile terminal, the method comprising:
- allowing, via a wireless communication unit of the mobile terminal, wireless communication with at least one other terminal;
- detecting, via a sensor unit of the mobile terminal, a gravity characteristic of the mobile terminal;
- outputting, via a touchscreen of the mobile terminal, a user-settable gravity sensitivity threshold option for setting a gravity detecting sensitivity of the sensor unit;
- receiving, via a controller of the mobile terminal, a selection signal indicating a selection of a first gravity sensitivity threshold;
- determining, via the controller, the mobile terminal is in a state of falling when the detected gravity characteristic of the mobile terminal is less than or equal to the selected first gravity sensitivity threshold; and
- executing, via the controller, a predetermined function mapped to the determined falling state, wherein the predetermined function includes executing a terminal diagnostic function on the mobile terminal; and
- varying a diagnostic range of the terminal diagnostic function in accordance with at least one of the detected gravity characteristic of the mobile terminal and a detected height at which the mobile terminal fell from.

12. The method of claim 11, further comprising:
- detecting, via the controller, an amount of time the mobile terminal is in the falling state; and
- only executing the predetermined function when the detected amount of time is greater than or equal to a set time threshold.

13. The method of claim 11, further comprising:
- detecting, via the controller, an impulse characteristic of the mobile terminal hitting an object after the free falling state; and
- only executing the predetermined function when the detected impulse characteristic is equal to or greater than a set impulse threshold.

14. The method of claim 12, further comprising:
- detecting, via the controller, an orientation of the mobile during the determined falling state,
- wherein when the detected gravity characteristic of the mobile terminal is less than or equal to the selected first gravity sensitivity threshold, the executing step performs at least one of 1) executing the specific function irrespective of the detected orientation of the mobile terminal, 2) executing the specific function in further consideration of the detected orientation of the mobile terminal, and 3) executing a different specific function based on the detected orientation of the mobile terminal.

15. The method of claim 11, further comprising:
- detecting, via the controller, an amount of time the mobile terminal is in the falling state; and
- executing either the predetermined function or a different predetermined function based on the detected amount of time.

16. The method of claim 11, wherein the executed predetermined function includes at least one of 1) displaying an alarm image on the touchscreen, 2) outputting an alarm sound, 3) outputting an alarm vibration, and 4) turning on and off preset LED lights included in a dot matrix on the mobile terminal.

17. The method of claim 16, further comprising:
- displaying a grid constituted with a plurality of cells on the touchscreen for a diagnosing touch recognition function; and
- changing a graphic in a cell when the cell is touched and the touchscreen recognizes the touch of the cell.

18. The method of claim 11, wherein the executed predetermined function includes at least one of 1) rejecting an incoming call, 2) turning a volume output off in the course of a multimedia playback, and 3) turning off or snoozing an alarm.

19. The method of claim 11, wherein the executed predetermined function includes at least one of 1) executing a voice recognition function, 2) executing a projector function, 3) connecting to an external device, 4) transmitting a message to at least one other terminal, and 5) storing a current terminal execution configuration of the mobile terminal.

20. The method of claim 11, further comprising:
- determining, via a position location module of the mobile terminal, a current location of the mobile terminal,
- wherein the predetermined function includes determining the current location of the mobile terminal, and outputting information concerning a terminal service center which is nearest from the calculated current terminal location.

* * * * *